United States Patent [19]
Oxley et al.

[11] Patent Number: 4,775,932
[45] Date of Patent: Oct. 4, 1988

[54] COMPUTER MEMORY SYSTEM WITH PARALLEL GARBAGE COLLECTION INDEPENDENT FROM AN ASSOCIATED USER PROCESSOR

[75] Inventors: Donald W. Oxley, Carrollton; Timothy J. McEntee, Dallas; Satish M. Thatte, Richardson, all of Tex.

[73] Assignee: Texas Instruments Incorporated, Dallas, Tex.

[21] Appl. No.: 636,187

[22] Filed: Jul. 31, 1984

[51] Int. Cl.⁴ .............................................. G06F 12/00
[52] U.S. Cl. .................................................. 364/200
[58] Field of Search ... 364/200 MS File, 900 MS File, 364/300 MS File

[56] References Cited

U.S. PATENT DOCUMENTS

| | | | |
|---|---|---|---|
| 3,882,470 | 5/1975 | Hunter | 364/900 |
| 4,121,286 | 10/1978 | Venton et al. | 364/200 |
| 4,123,795 | 10/1978 | Dean, Jr. et al. | 364/200 |
| 4,189,773 | 2/1980 | O'Meara | 364/300 |
| 4,446,516 | 5/1984 | Nishimura | 364/200 |

OTHER PUBLICATIONS

Aho, "Data Structures and Algorithms," A-W Pub. Co., 1983, chapter 12, pp. 378-410.

Primary Examiner—Gary V. Harkcom
Assistant Examiner—Christopher H. Lynt
Attorney, Agent, or Firm—Kenneth C. Hill; James T. Comfort; Melvin Sharp

[57] ABSTRACT

A memory system for association with a user processor for operation independently from the user processor includes a physical memory and an interface unit for enabling the associated user processor to access the physical memory. The physical memory is represented in a virtual address space which is garbage collected in parallel with the operation of the user processor. The garbage collection process includes reference count deallocation and a garbage collection algorithm for deallocating cyclic structures not deallocated by the reference count process. The reference count process includes providing for a reference count indicating the number of pointer references to a memory block in the virtual address space. When the reference count becomes zero, and no other references to a memory block exist, the block may be freed. In the garbage collection algorithm, the virtual memory space is traced in areas, called OLDSPACE, and compactly copied into a new area, called NEWSPACE. The OLDSPACE and NEWSPACE are further scavenged to insure that all referenced blocks of memory are copied, and the remaining OLDSPACE is cleaned. The garbage collection process is performed in parallel with the operation of the user processor.

2 Claims, 11 Drawing Sheets

COMPUTER MEMORY SYSTEM WITH PARALLEL GARBAGE COLLECTION INDEPENDENT FROM AN ASSOCIATED USER PROCESSOR

BACKGROUND OF THE INVENTION

1. Field of the Invention

This invention relates to improvements in memory systems, and more particularly to improvements in a memory system of the type which enable automatic memory operations, in general, and garbage collection and reference counting, in particular, independently of a user processor with which it is associated.

2. Description of the Prior Art

The development of storage management systems has a long history with many related branches of research. Over the years, a great deal of attention has been given to the allocation and deallocation of memory structures. Many memory structures to this end are shown by H. M. Deitel, *An Introduction to Operating Systems*, Addison-Wesley, Mass., Chapter 7, 1982. Other major issues are discussed by D. Knuth, The Art of Computer Programming, *Vol.* 1: Fundamental Algorithms, Addison-Wesley, Reading, Mass., 1968.

The invention herein described is primarily concerned with garbage collected heap managed memories. Heap managed means that the memory is allocated and freed (either explicitly or implicitly) without regard to the temporal order or the size of the memory unit under consideration. A garbage collected memory is one in which usable memory is automatically reclaimed, and the memory may be reorganized from time to time to efficiently utilize the space of the memory, as needed. A background survey of garbage collection techniques and related background materials is presented by Cohen, J. "Garbage Collection of Linked Data Structures", *Computing Surveys,* Vol. 13, No. 3, September, 1981, pp. 341-367, and also by P. Bishop, "Garbage Collection in a Very Large Address Space", Massachusetts Institute of Technology, Working Paper 111, September, 1975.

Becoming of interest with the rapid development of artificial intelligence is the development of so-called "knowledge bases", large data bases, for use, for instance, in containing extremely large or complex information stores requiring dynamic organization. See, for example, Suwa, M., et al, "Knowledge Base Mechanisms", *Preliminary Report on Fifth Generation Computer Systems,* ICOT, 1980. Examples of some large data bases under consideration or implemented include, for instance, data bases which contain legal information, such as verbatim case reports, medical information for use in diagnosing possible diseases which present particular symptoms, certain patent information including abstracts, claims, and so forth. In such data bases, it is often desirable to search through sometimes millions of words and characters, then identify a particular record (case, patent, diagnosis, etc) related to the words and characters.

Presently, particular computer languages such as Lisp, and to a lesser extent, Pascal and Ada, are used to implement such heap allocated data bases (Lisp supporting garbage collected data bases, as well). In such traditional architectures where the memory allocation, de-allocation, garbage collection and compaction is provided, normally the language runtime support and the compiles used has the responsibility for the garbage collection and compaction, and if a virtual memory system is provided, it is normally the responsibility of the hardware and operating system to manage the virtual memory system. Typically, for example, the operating system will normally use some type of demand paged least recently used (LRU) scheme for determining how to move pages to and from the backing store, and the garbage collector specifies which pages will be needed or which will no longer be needed.

Among the key problems often encountered by programmers is the individual word access speed, which is related directly to the speed of the particular memory used. Also, the speed of allocation presents a difficult problem if memory units are not either last-in first-out (LIFO) allocated or of constant size. Additionally, the size of a virtual memory space is often of concern, since garbage collection costs increase with the size of the space being collected not with the amount of garbage being reclaimed. Finally, security or safety is a significant problem, since normally programs can ignore the actual structure of a memory organization, either intentionally or through inadvertence in program or memory design and blocks of data can easily be overwritten or obliterated entirely.

Typical memory systems with which the invention can be used, for example can be seen in copending patent applications by Oxley et al, entitled "COMPUTER MEMORY SYSTEM", Ser. No. 630,476, filed July 12, 1984 and by Thatte et al, entitled "COMPUTER SYSTEM ENABLING AUTOMATIC MEMORY OPERATIONS", Ser. No. 630,478, filed July 12, 1984, both of said applications being assigned to the assignee hereof and incorporated herein by reference.

In the operation of a typical memory system of the type described in said copending patent applications together with their associated user processors, the user processor requests the allocation of memory space as needed. Often, the allocation of the memory is done in a virtual address space. The allocation is often accomplished by apportioning the space from the beginning of the virtual address space to the end. As the virtual address space becomes fully allocated, eventually requests for additional space must be denied, until reusable space in the previously allocated virtual address space has been identified and reclaimed.

In the past, garbage collection techniques have been done typically by interrupting the processing being done by the user CPU, and running a garbage collection algorithm in the CPU to clean up the allocated virtual address space. As memories became larger and larger, typically the garbage collection process took more and more time, during all of which the main processing routine was not being run.

In recognition of this problem, "parallel" or "concurrent" garbage collection has been proposed, although to date, insofar as is known to applicants herein, true parallel garbage collection processing has not been actually achieved. In the consideration of parallel garbage collection processing, several terms need specific definition, as they are variously used in the art. As used herein, "parallel" garbage collection processing refers to garbage collection processing which is performed completely independently of the user processor and simultaneously with the user processor operation. (In the past, the term "parallel" with reference to garbage collection processing has included "concurrent".)

The term "concurrent" processing is used to mean garbage collection processing which is interleaved or time-shared with user CPU operations. Concurrent garbage collection, for instance, includes time shared accessing and processing operations, and may include garbage collection processing conducted by a single processor working alternately on garbage collection routines and regular operating routines.

It has been suggested by E. W. Dijkstra et al, "On-the-Fly Garbage Collection: An Exercise in Cooperation," *Communications of the ACM*, Vol. 21, No. 11 (Nov., 1978), pp. 966–975 to use a second processor for performing garbage collection, at least concurrently with the operation of the user processor (or the "mutator"). Another garbage collection method was suggested by G. L. Steele, "Multiprocessing compacting garbage collection," *Communications of the ACM*, Vol. 18, No. 9 (September 1975) pp. 495–508. In the Dijkstra process, allocated blocks are marked as being black, gray, or white, depending upon the use by the user program. The Steele process uses semaphores to mark the cells. Both processes, however, appear to require the participation of the user processor, at least in the marking of the cells used, and in operating in a timed concurrent manner with the garbage collection processor.

Another technique which has been used is by providing each block or cell in memory with a reference counter which provides an indication whether the block or cell is the subject of a pointer or reference from elsewhere. The assumption is made that if no reference is made to the block or cell, it is unreachable in the memory, is garbage, and therefore can be collected and the space reclaimed.

P. B. Bishop, supra, has suggested that garbage collection can be done in less than the entire virtual address space by performing garbage collection on areas into which the address space is broken. Each area maintains a list of pointers into the area so that entire address space need not be searched in determining references to cells or blocks within the area being collected.

SUMMARY OF THE INVENTION

In light of the above, it is therefore, an object of the invention to provide a garbage collected memory system which enables automatic memory operations independently of the user processor with which it is associated.

It is another object of the invention to provide a garbage collected memory system of the type described in which the responsibilities of the user CPU and a memory management unit (MMU) are separate, with the CPU having no pointer management responsibility; the memory management unit having the ability to freely move data within the memory; both the CPU and MMU both being capable of operating separately, independently, and concurrently.

It is another object of the invention to provide a garbage collected memory system of the type described which is free from particular CPU language implementations, operating systems, and CPU microcodes.

It is still another object of the invention to provide a memory management system of the type described in which blocks of memory carry informational and identifying tags to enable the CPU and MMU to be separate in operation, as above mentioned, and further, in which garbage collection of the memory system is managed strictly by the memory management system.

It is another object of the invention to provide a memory system of the type described in which garbage collection in the memory system is performed in parallel with the operation of the user processor and in which both pointer reference counts and a garbage collection algorithm are used.

These and other objects, features, and advantages will become apparent to those skilled in the art from the following detailed description when read in conjunction with the accompanying drawings and appended claims.

The memory system, in accordance with a broad aspect of the invention, presents a memory system which is characterized in that it responds to conditions, equations or instructions from a user CPU to allocate memory blocks and allows the user CPU to execute equate, read, write and move instructions with regard to the allocated memory blocks, and which is garbage collected in parallel with and independently from the user processor. The memory system operation is based upon the use of a binding register which interfaces the user CPU to the memory, and which enables the memory to be seen by the user CPU as a block oriented memory, and which permits the memory management unit to control memory overhead functions, including the garbage collection processing independently and practically invisibly from the user CPU.

BRIEF DESCRIPTION OF THE DRAWING

The invention is illustrated in the accompanying drawings in which.

In the various figures of the drawing, like reference numerals are used to denote like or similar parts.

DETAILED DESCRIPTION OF THE PREFERRED EMBODIMENTS

Figure 1:
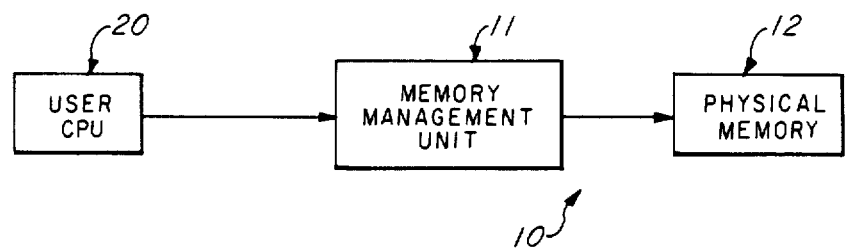
FIG. 1 is a block diagram of the interrelationship of the user CPU, the physical memory and a memory management unit in accordance with the invention.

As shown in FIG. 1, the memory system 10 of the invention includes a memory management unit 11 and physical memory 12, associated with a user CPU 20. As will become apparent, unlike previous memory operations, the responsibilities of the user CPU 20 and the memory management unit (MMU) 11 advanced herein are separate. That is, the CPU 20 has no pointer management responsibilities, and the MMU 11 can freely move data within the memory. Moreover, the CPU 20 can not accidentally or intentionally destroy or change the structural information of the memory which is necessary to maintain the organizational integrity of the memory. As will become apparent, the user CPU 20 can be practically any type or kind compatible with the memory system 10.

Figure 2:
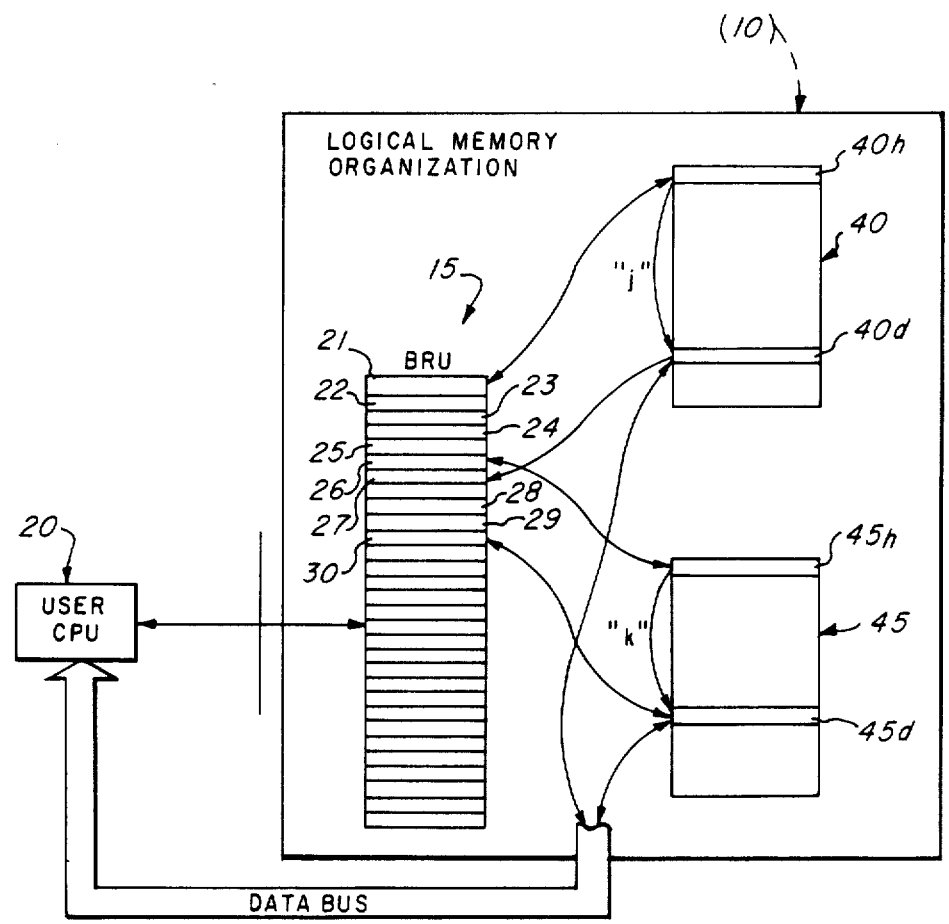
FIG. 2 is a diagram of the memory system in accordance with the invention illustrating its appearance as a logical memory space to a user processor with which it is associated.

The memory system 10 has the appearance to the user CPU 20 of being block oriented. With reference now to FIG. 2, despite the actual or hardware configuration of the memory system 10, it has an apparent logical memory organization (10) as seen by the user CPU 20, as indicated by the reference numeral (10) and its associated dotted arrow. The logical memory organization (10) is referred to herein as a "logical address space", and, as will become apparent, is distinguished from a "virtual address space" which is a memory representation or abstraction as seen by the memory management unit, below described, and from a physical memory, which is the actual physical memory elements of the memory system.

The logical memory system 10 has a binding register unit 15, described below in detail with reference to FIG. 3, which serves as a window or portal into and out of the logical memory system (10). (The binding register unit 15 is a real part of the memory system 10, and is responsible for converting the block oriented view of the user CPU into the virtual address space in which the memory management actually takes place.) The philosophy of the binding register unit 15 is based upon the notion that at any instant, the user processor 20 can be directly addressing only a limited number of blocks; more specifically, the user processor can directly address those blocks whose pointers are contained in a set of binding registers within the binding register unit 15.

The user CPU 20 typically uses the binding register unit 15 in two modes of operation. Thus, the binding register 15 may be loaded with a block identifier in order to establish the addressability of a partiuclar block in memory. This is referred to as a "binding" of a specific register to the block whose addressability is being established. The term "binding" is used to emphasize the association of the register name, number, or identifier and the block. As will become apparent, there are certain constraints upon the source of block identifiers which can be contained in a binding register. Except for an initializing bootstrapped address, the only source of block addresses is from a previously bound block or another binding register.

The other primary mode of operation of the binding register 15 is as a base for referencing some value within a previously bound block. For example, in response to a CPU request for the data in a specified relative block location, the MMU develops an address for the particular value to be found or contained within the block by adding an index count to the contents of the block address field contained in the binding register. It will be appreciated that it is necessary to verify that the index is a valid one for the particular block, for example, that the index does not specify the fourth word of a two word block. The binding register unit supports this type of addressing as a relative index to a register name which is currently bound to a block. It therefore provides complete checking to see that the index is valid before permitting the reference.

More specifically, the binding register unit 15 includes a number or set of individual binding registers 21, 22, ... 30, each of which is addressable and manipulatable by the user CPU 20. The manner by which the user CPU addresses the binding registers can be, for example, merely by specifying a particular binding register, such as "register 1", "register 5", and so on. The binding register unit 15 may have as many binding registers as needed for the particular application of the memory management unit under consideration.

Within the memory system 10 is a large physical memory (below described in detail) from which memory blocks can be allocated. For example, in the diagram of FIG. 2, two memory blocks 40 and 45 have been established by appropriate commands from the user CPU (below described). Each of the blocks which are established includes a header portion 40h and 45h, at least a portion of which is reproduced into one of the binding registers 20-30 of the binding register unit 15. The header of each respective block may contain, among other things, block identifying data, block type data, data indicating the length of the block, flags, and the like.

Additionally contained in each block 40 and 45 are data words 40d and 45d, respectively. The data words 40d and 45d are displaced from the respective headers of the blocks 40 and 45 by a number of address locations. The number of address locations depends on many factors, including the specification of a particular address displacement by the user CPU. More particularly, the user CPU can write data into the block 40 at location 40d by specifying a displacement from the header, contained, for instance, in register 21 of the binding register unit 15. The manner by which the user CPU specifies the desired block location is by specifying the particular binding register to which the block is bound (for instance, "regsiter i") and the displacement within the bound block (for instance, "j"). The specified value can then be returned directly to the user CPU as data, or can be written into the binding register unit in (the same or different) specified binding register.

Thus, by way of example, and as will become even more apparent, the user CPU 20 may issue a command to the memory system (10) to create a block denoted by the reference numeral 40, of some specified length. In so doing, the CPU issues a direction to the MMU to place a pointer to the block 40 in a CPU directed target binding register, such as register 21. Thereafter, the CPU 20 might issue a command to write data into the block 40 by specifying a displacement "j" from the address of the header pointed to by the pointer in binding register 21. It should be emphasized that the CPU 20 only specifies the particular binding register containing the pointer (10) and the displacement "j", not the address of the block 40.

Figure 3:
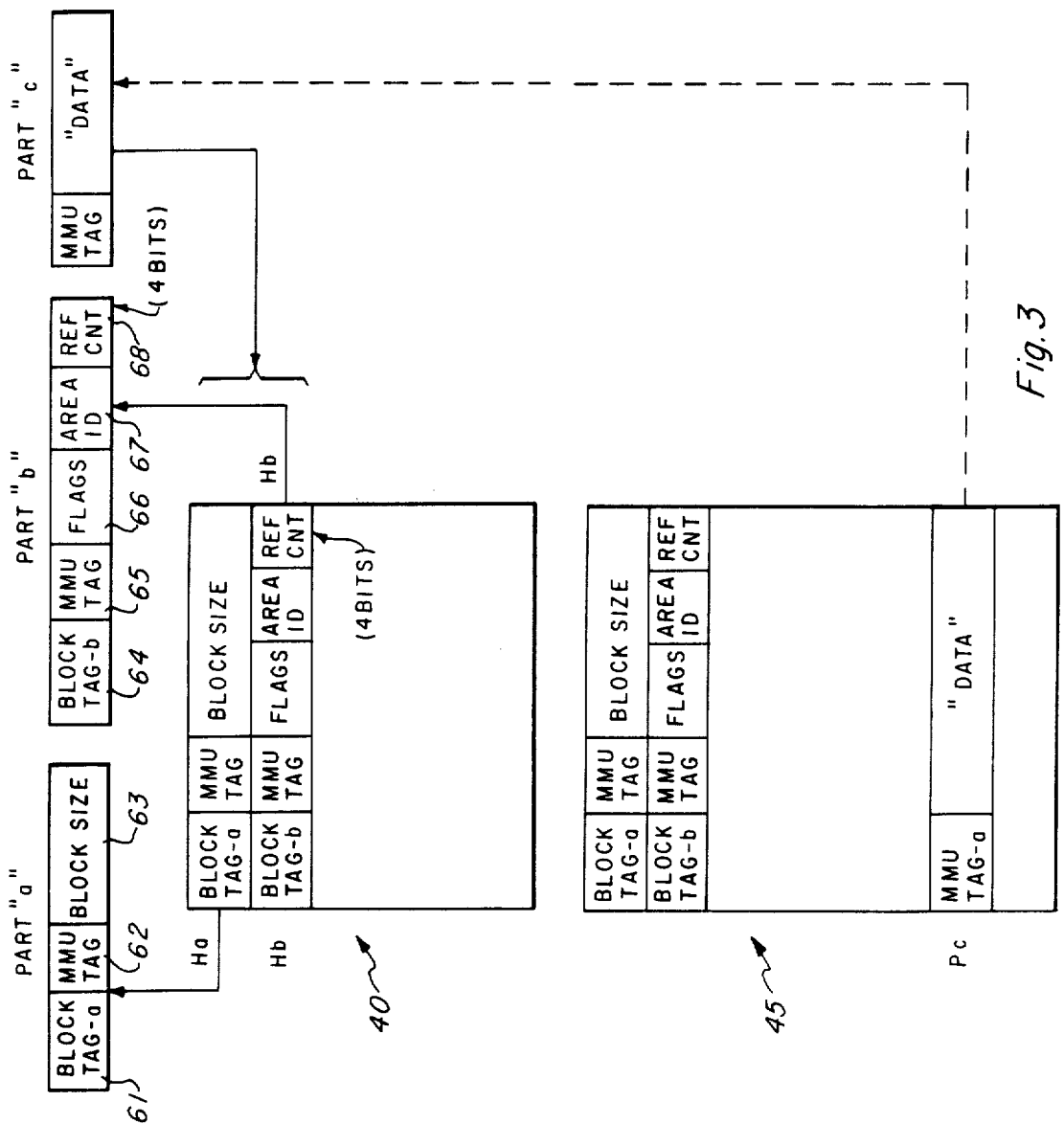
FIG. 3 is a box diagram of a binding register configuration for use in a memory management unit in accomplishing a preferred embodiment of the memory system of the invention.

The binding register of the binding register unit 15 is described in greater detail in FIG. 3, to which reference is now made. Each binding register of the binding register unit has three parts, denoted "Part a", "Part b", and "Part c". Each of the parts a-c contains certain block identifying information, as below described in detail. For reference, blocks 40 and 45 are shown, of which block 40 is bound to the binding register including Parts a-c. (The same principles apply to block 45, as will be apparent.) It can be seen that the header information in the block 40 is contained at the beginning of the block 40, with first and second segments containing information which corresponds to the information in parts a and b of the binding register. Additional information not of interest herein may be contained in the header portion 40h.

With reference once again to Part "a" of the binding register, three pieces of information are given, namely a user CPU block tag-a 61, memory management unit tag 62, and a block size segment 63.

Part "b" of the binding register has five segments. The first segment 64 is for a user CPU Tag-b, followed by a memory management unit tag 65, an area 66 for certain flags, an area 67 for carrying an area-id, and a two segment area for carrying a reference count (below described in detail). The flags in the flag portion 70 of register Part "b" of the binding register may contain numerous flags, examples of which are "lock", "bound", "scavenge", and so on. Briefly, a lock flag may be used, for example, in the establishment or moving of the block during which time any addressing of the block by other than the memory management unit is prohibited. A bound flag may be, for example, used to indicate that the block is bound to a binding register, and a scavenge flag may be used during a garbage collection process. The various flag operations are described below in detail.

Part "c" of the binding register also has two segments. The first segment 64 is for a memory management unit tag and the second segment 71 is for either data or for a pointer to the header of a particular block. In either, the contents of segment 71 appear as "data" to any observer. It should be noted that the information in Part "c" of the binding register might not actually be reproduced in the header of the block 40, but may merely exist only as a part of the binding register.

Thus, in the establishment or binding of a block within the binding register unit, as mentioned above, in the process, a particular block location or address is referenced by the user CPU by a relative index. As shown in FIG. 3, the particular location referenced is denoted by Pc in a referencing block 45. In this example, it is this "data" word which contains the pointer reference to the next subsequent block to be bound to the binding register unit. The word at location Pc is moved to Part "c" of the binding register as indicated by the dotted line. The MMU tag 64 indicates whether or not the "data" is in fact a pointer. If not, the process is immediately discontinued or an error message may be generated. If the "data" in the portion 71 contained in the Part "c" register is a valid pointer, that pointer will reference the header information 40h of the block 40 to be bound. The information in the first and second registers of the header 40h are then moved to registers Part "a" and Part "b" in the manner described above, thereby completing the binding process.

Figure 4:
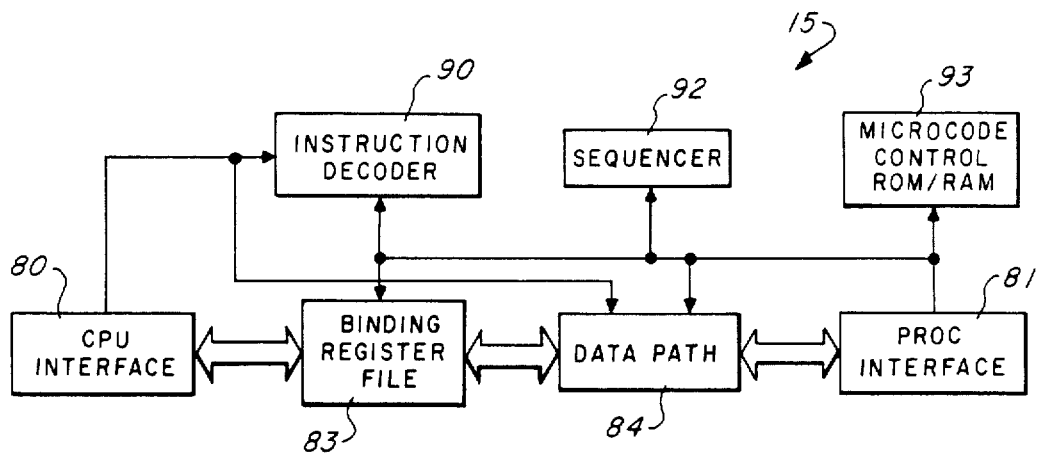
FIG. 4 is a box diagram of a binding register unit for use in accomplishing the memory system, in accordance with the invention.

To accomplish the binding register unit which enables the logical memory organization of FIGS. 2 and 3, hardware arranged in the manner illustrated in FIG. 4 can be employed. The hardware for realizing a binding register unit 15 in accordance with the invention includes CPU interface 80 for connection between the user CPU 20 (FIG. 1) and the binding register unit 15, on the one hand, and a processor interface 81 for connection between a memory management unit controlling processor (FIG. 5, described below) and the binding register unit 15. The binding register unit 15 includes a binding register file 83 for containing individual binding registers into which information is written, as above described. The binding register file 83 is connected directly to the CPU interface 80. In addition, the binding register file 83 is connected to the processor interface 81 by a data path controlling circuit 84.

Additionally, an instruction decoder 90 is provided, with connection to the CPU interface 80 to receive instructions from the user processor, and to operate to decode the particular instructions issued by the user CPU. The output from the instruction decoder 90 is directed to a sequencer 92 and a microcode generator or control ROM/RAM 93. The microcode generator or control ROM/RAM 93, in conjunction with the MMU processor, controls the operation of the binding register file 83 and the data path selection circuit 84.

As will be apparent, the circuitry for the binding register unit 15 can be fabricated in standard TTL or MSI circuitry or on a custom LSI or VLSI chip using well known techniques. As said above, the operation of the binding register 15 to effect the memory architecture described, is under the control of the microcode control program in the microcode ROM/RAM 93. The design of the microcode will depend upon such factors as the type of memory processor employed (described below), the type of hardware for construction of the memory system, and so on. By way of example, and for the sake of completeness, a Lisp program which can be run on a standard list machine to simulate the operation of the memory system of the invention, including the binding register unit, is shown in Appendix A attached hereto. It will be understood that various other forms of implementation of the memory system can be equally advantageously employed.

Figure 5:
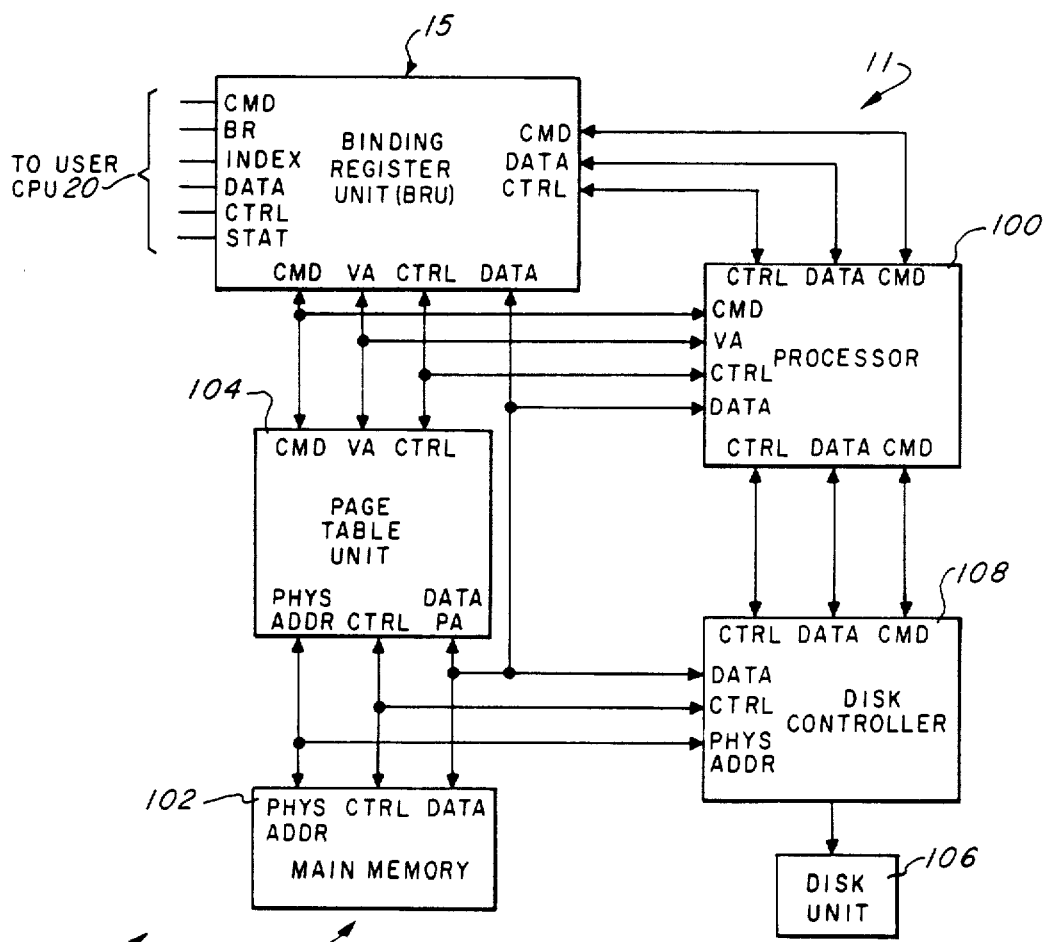
FIG. 5 is a box diagram of a generalized hardware implementation of the memory system, in accordance with the invention.

The hardware for realizing the memory management unit 11 in conjunction with the physical memory 12 to form the memory system 10 of the invention is quite general, and is shown in FIG. 5. As illustrated, the memory system 10 includes a binding register unit 15, as above described, connected to the user CPU 20 (see FIG. 1). As shown, command, binding register, index, data, control and status lines are provided to the user CPU 20 from the binding register unit 15 as above described. The operation of the memory management unit 11 is controlled by a processor 100, to which command, virtual address, control and data lines are provided for connection to the binding register unit 15, as shown. Depending upon the particular type of physical memory in conjunction with which the memory system of the invention is to be operated, various memory interfacing apparatuses can be provided for control by the processor 100. Thus, as shown, a main memory 102 is provided which may include, for instance, a hard wired physical memory of semiconductors, bubble domain cells, or any other memory elements known in the art. The main memory 102 is connected to the binding register unit 15 by a page table unit 104. The data flow between the binding register unit 15 and physical memory 102 is controlled through the page table unit 104 by the processor 100, having command, virtual address, control and data lines connected between the binding register unit 15 and page table unit 104. In addition, a disk unit 106 may be provided as a form of memory with which the memory management unit 11 in accordance with the invention may be used. The disk unit 106 can be of any magnetic disk, optical, or other well known disk memory, as known in the art. The disk unit 106 is controlled by a disk controller 108, again controlled by the processor 100 by control, data, and command lines, and with respect to the binding register unit 15 and page table unit 104 by data, control and physical address lines, as shown.

It should be noted that although a physical main memory 102 and disk unit 106 are shown, it is not intended that the invention be limited in any way to such memory types, as it will be apparent to those skilled in the art that other memory types and configurations can be equally advantageously employed in practicing the invention.

In the operation of the binding register unit, as has been mentioned, one or more flags are provided in the block header. At least one of the flags serves as a lock so that, when set, no changes can be made by the user CPU to the block. This is useful, for example, when the block is being copied, moved, rearranged, and the like, for instance during garbage collection or other action being performed by the memory management unit.

Another flag which may be employed is to determine whether the block is bound or not. Thus, when the memory system wishes to move or modify a block, it must be able to determine if the block is currently bound to a binding register.

In addition, the block size indication in register portion 68 of Part "a" of the binding register is necessary to determine whether an index exceeds the valid length of the block.

The MMU tags in segments 62, 63 and 64 are associated with both the header and the data portions of the block. The tags required by the memory management unit are enforced by the binding register unit so that the user processor is prevented from writing a tag or "pointer" and also to verify that a cell actually contains a pointer before attempting to bind a particular block. It should be noted that in a tagged memory of the type described herein, the tags cannot be arbitrarily set by the user processor. Thus, the memory management unit must continually verify that the user processor is not attempting to set prohibited tabs, that is, pointers, headers, forwards, and so on. Thus, since each pointer carries an MMU tag indicating that the data represents a pointer, the pointers within the blocks may not be modified by the user processor. The user processor can, however, over-write the pointer with data, which would result in the destruction of the pointer reference, but is prohibited from direct alteration or modification of the pointer.

With the memory system configured in the manner thus described, the memory system is addressable or accessible in the logical address space by a number of predetermined commands. Among the commands which can be used are (1) a command to allocate block space; (2) a command to copy a pointer from one indexed block register to another within the same or different block in the logical address space; (3) a command to perform an "EQ test" which tests two registers or cells in the logical address space to determine whether they both (a) contain pointers which refer to the same block or (b) contain the same data; (4) a command to read an indexed location in a specified block; and (5) a command to write user processor generated data ito an indexed location in a specified block. It will be appreciated that the allocate command, copy instruction and the "EQ Test" serve to enable the user processor to determine the configuration of the memory system and to arrange the memory system to any desired configuration. The read and write commands allow the processor to interact with the memory. Even so, it should be noted that the user processor is not permitted to write pointers into the logical address space. Although other commands can be equally advantageously employed, as will be apparent to those skilled in the art, the above enumerated commands are presently considered to be minimally required of the memory system of the invention; that is, it is considered that the five commands enable the operation of the memory system, and distinguish it from memory systems of the prior art. It will be apparent to those skilled in the art that other additional commands can easily be implemented with the memory system thus described, many of which can be accomplished through various combinations of the specified above commands. The commands are described in further detail below.

With the memory system thus constructed, its operation, in general, will be described as follows. The memory system 10 is first associated with a user processor 20. The user processor 20 can be of any kind or type, so long as it is able to communicate with the binding register unit 15. The restriction is merely a hardware compatibility restriction, it has nothing to do with the operation of the memory, its hierarchy, its organization, etc.

When the user processor wishes to write into memory, it first issues a block allocate command to the memory management system 10. As a part of the block allocate command, the user processor specifies the size of the block desired and a binding register to which the block to be allocated or created is bound. The memory system then creates the requested block. The user processor 20 may then issue a write command directed to the specified binding register, and stating a relative block location at which the processor desires that data be written. Thereafter, if it is desired to read the data previously written, the processor 20 issues a read statement directed to the binding register to which the block is bound at that time specifying the offset at which the data was previously written. The memory management system then delivers to the user processor the previously written data.

One aspect of the operation of the memory system 10 includes the formulation and operation of the pointer system within the allocated blocks. Thus, if, for instance, it is desired to reference one block from another, a pointer may be established in the referencing block to the referenced block at a relative address. The pointer would be established by the memory management unit 11, not by the user processor, and would be located at an indexed relative location in the referencing block. If desired, the user processor can issue an equate command to the memory system 10 to determine whether two relative locations in a particular block or in two blocks contain pointers to the same block. (The equate command can also be used to determine whether two particular relative locations of the same or different blocks contain the same data). It should be noted that although the relative locations of the allocated blocks can be read directly by the user processor, if the relative locations contain pointers to other blocks, the pointers read may not necessarily be the same. For example, a block may contain an invisible pointer which would result in an apparent different reference. For instance, if the pointer of say block A points to block B, and the pointer of block C points to block D which in turn points to block B, the pointers of blocks A and C would point to the same block, but would not appear to be equal if viewed by the user processor as data.

Finally, if the user CPU has completed all operations regarding a particular block, the user processor may issue a deallocate command to the memory management unit 11 requesting that the block be destroyed.

With the memory management unit 10 thus configured, it will be appreciated that many operations which heretofore were necessarily conducted by the CPU, the compiler, assembler, or such, can now be automatically performed or implemented. Notably, garbage collection can be implemented automatically, without a requirement that the ongoing processing steps of the CPU be halted during the garbage collection process.

Figure 6:
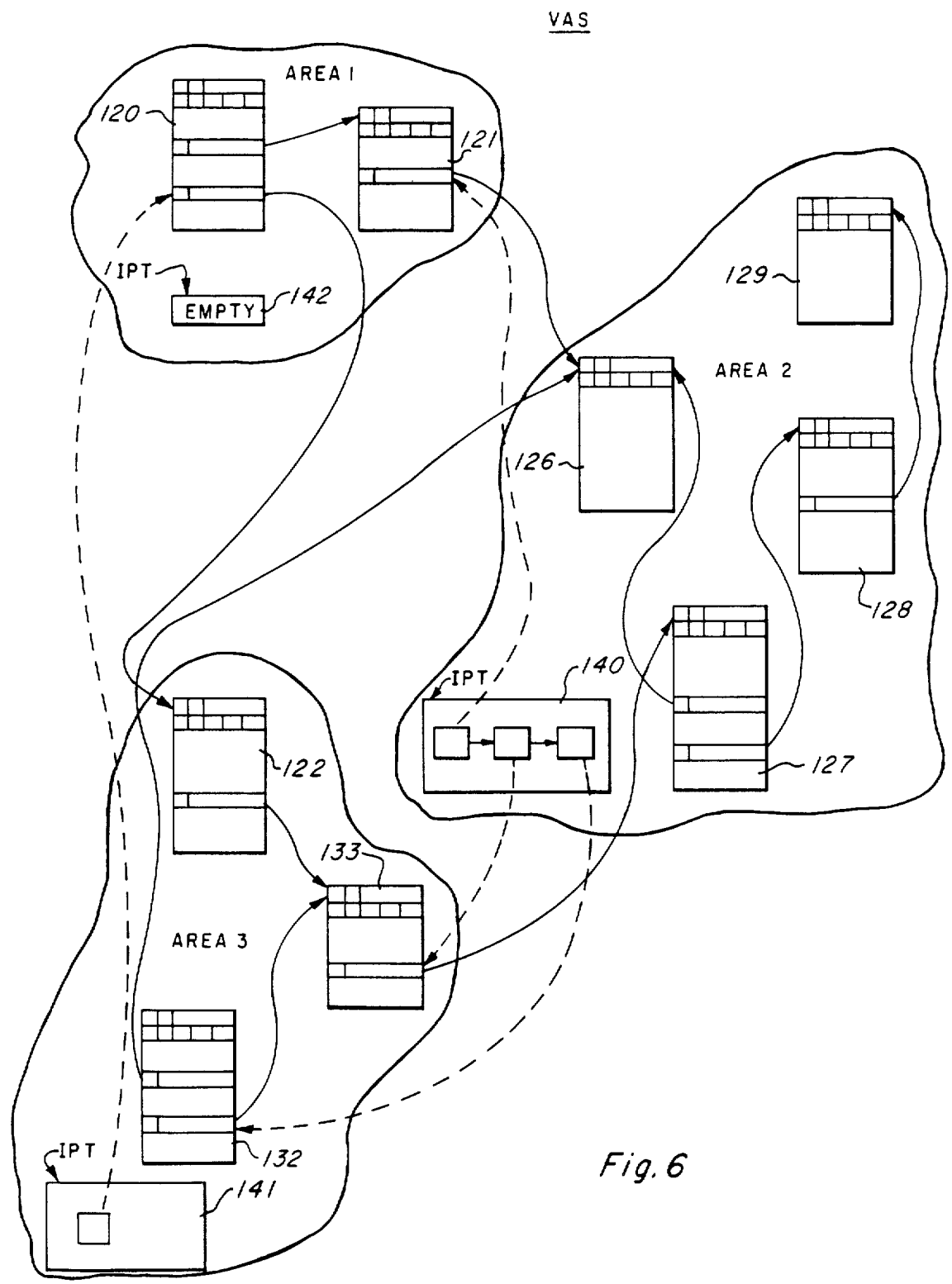
FIG. 6 is a diagram of a portion of the virtual address space of the memory system in accordance with the invention illustrating various forms of inter- and intra-area pointer configurations.

The virtual memory is divided into arbitrary areas specified by the CPU. Thus, as shown in FIG. 6, three areas of arbitrary size have been specified somewhere in the virtual address space. Since the areas are created at the request of the CPU, they are visible to it. The area No. 1 includes two blocks, area No. 2 contains four blocks, and area No. 3 contains three blocks, respectively as shown. Each of the blocks may contain a pointer to another block or set of blocks. As shown, in area 1, the block 120 contains two pointers, one to the header of block 121, also in area 1, the other to block 122 in area 3. The block 121 contains a pointer to block 126 in area 2. The block 126 contains no other block pointers. In area 2, as well, a block 127 has two pointers, one to block 126 and the other to block 128. The block 128 has a pointer to block 129, the pointer chain from block 127 being entirely within area 2 to block 129. Finally, in area 3, block 132 contains two pointers, one to block 126 in area 2 and the other to block 133 in area 3. Block 133 also has a pointer to block 127 within area 2.

As will become apparent, the use of areas in the virtual address space enables garbage collection processing on small portions of the virtual address space. It is possible to collect garbage in a single area without collecting the entire virtual address space, as was required in the prior art. This, in turn, reduces the cost (both time and processor cycles) for garbage collection. A collection can be performed on an area when it is likely to contain significant garbage even though there may be relatively little garbage in other areas.

One part of the garbage collection process, as will be described, is the tracing cycle which identifies all potentially reachable blocks in an area from a set of "root pointers". This is dependent on having associated with each area a root, which identifies every block within the area that can be reached directly from outside that area. The set of root pointers associated with an area contains references originating at binding registers, as well as pointers directly coming from blocks that are not in the area; these pointers originating in other areas, but "coming in" to point at blocks in the area. These are called "inbound, inter-area pointers". Pointers originating in the area but "going out" to point at blocks residing in other areas are called "outbound inter-area pointers". Pointers originating in and pointing at blocks in the same area are called intra-area pointers.

Each area has a control structure associated with it called an inbound pointer table (IPT). The IPT contains information necessary to find all the inbound inter-area pointers to the area. In the particular embodiment illustrated, the IPT does not contain references coming from the binding registers, bound to the blocks in that area. Thus, the root space for an area consists of a set of binding registers, plus the area IPT.

With reference again to the area configuration shown in FIG. 6, there are four current inbound references in the associated areas. Thus, the pointer from block 121 in area 1 to block 126 in area 2 is an inter-area pointer, and its reference is contained in the IPT 140 in area 2. Since block 132 and block 133 also contain pointers from another area, area 3, those pointers are also identified in the IPT 140 in area 2.

Since block 122 in area 3 is pointed to by the pointer in block 120 in area 1, the pointer in the block 120 is identified in the IPT 141 in area 3. Finally, because there are no in-bound pointers from areas 2 or 3, IPT 142 in area 1 is empty.

As will become apparent, inasmuch as the garbage collection within the memory unit 10 is invisible to the CPU, and independent of it, the garbage collection techniques used can, in fact, efficiently be compacting garbage collection techniques, enabling even more efficient use of the physical memory of the memory management unit 10. Two major mechanisms for the management of memory are described hereinbelow. The first means by which the majority of unusable memory is reclaimed is a reference count mechanism, and the second is copying garbage collection.

Accurate maintenance of a reference count for all blocks enables the quick recovery or reclamation of garbage blocks so that the recovered memory may become usable again. Although not all garbage blocks are reclaimable by way of the reference count mechanism, it is the primary mechanism to reclaim the vast majority of garbage blocks.

As outlined above, in the header to each block is a reference count field (see FIG. 3), which contains a count representing the number of references to a block from any other block (including itself). Thus, references to a block originate from cells in a block located in the same or another area. The count does not include any references to the block from binding registers, nor any references from the Inbound Pointer Table.

The reason that a binding register reference is not counted in the reference count field is to optimize performance, recognizing that additional complexity in both the hardware and supporting software may be required. The optimization may be necessary in some instances because of the frequency of list searching in which a block may be bound to a binding register for a very short period (eg., "CDRing" down a list in LISP). Also not counted are references originating in the Inbound Pointer Table of another area, which point to an outbound pointer in an area. The reference is made from a control structure rather than a user cell. Further, the reference is really not made to a block; instead, the reference is made to a specific user cell within a block.

When a block is initially allocated, it has a reference count of zero but is "protected" by the binding register to which it is bound. Any time a new reference is established, the reference count is incremented. (The possibility that an additional reference may cause an overflow in the reference count of the block is discussed below.) On the other hand, any time a reference within a block is destroyed, the reference count of the target block is decremented.

Additions and removals of references to a block must be accurately reflected by increments and decrements of the reference count to the block. When the last reference of a block is destroyed, it is important that the reference count reaches the value zero, or it cannot be reclaimed. Not knowing that the block can be reclaimed may involve the unnecessary existence of far more blocks than the single block, since the user cells of the block may contain references to other blocks in memory. These, too, may be reclaimable. A far more serious problem could result if the reference count of a block is not kept accurately. If the count reaches zero while there are still one or more references to the block, and the block is not bound, it may be erroneously reclaimed. Later, if an outstanding reference accesses the non-existent block, unpredictible errors may be generated. This problem of leaving a "dangling reference" should be carefully avoided.

Accordingly, any block with a reference count of zero which is not bound to a binding register may be deallocated automatically. Thus, when the memory processor finds that the reference count of a block has made a transition from a 1 to 0, it interrogates the bank of binding registers to find if any binding register(s) is bound to the block. If no binding register points to the block, it is deallocated. By the same token, when the binding to a block from a particular binding register is destroyed, the other binding registers must be interrogated. If there are no other binding registers bound to the block, the memory processor checks the reference count of the block to determine if the block can be deallocated. If the reference count is zero, indicating there are no user cell references to the block, it is deallocated. (It should be noted that the terms deallocate and reclaim are used interchangeably in the description of the reference count mechanism herein.)

As will be appreciated, the reference count mechanism does not detect detached cyclic structures of two or more blocks, nor blocks whose only reference comes from a user cell of that block. In either situation, the blocks are unusable and should be reclaimed. Such blocks can only be reclaimed by a full garbage collection, as described below in detail. As such, the reference count is conservative in that it allows only a subset of the unreachable cells to be directly reclaimed; however, it never allows a reachable cell to be reclaimed.

A change in the reference count of a block may be generated as a result of a user operation such as a "copy" operation, or as a result of the removal of a reference when another block is cleaned; i.e., all pointers in its user cells are crushed.

A potential conflict exists because it is possible that both the memory processor and the CPU are attempting a simultaneous modification of the same reference count. For example, such a concurrent modification attempt may exist if there is a pointer in a block being cleaned by memory management at the same time that the CPU is changing a pointer to the same block. This conflict is avoided because of the nature of the hardware access to the block header (where the reference count is stored). The memory processor is essentially a serial resource which is used to perform the change for both the user and memory management.

As shown in FIG. 3, the reference count field in each block is comprised of four bits, which allows a maximum count of 15 to represent the number of references to the block. (While a reference count of 15 or less covers the vast majority of all cases, it is very desirable to actually carry the full reference count for each block.

One reason for carrying a full reference count is that the garbage collection algorithm described below decrements the reference count to zero for all garbage blocks, including those in cycles. This provides a powerful internal consistency check, if desired, and provides a mechanism for increasing the confidence in the garbage collector and reference count mechanism. To provide enlarged reference count capability, an extra bit, the "overflow" bit, is included in the second header cell, Hb, of each block. Further, a Reference Overflow Table (ROT), not shown, (an internal control structure using hash techniques) is maintained.

The full reference count algorithm is relatively simple. Should a maximum block reference count of 15 be surpassed, i.e, the block is given its 16th reference, the overflow bit of the reference count field is turned on. Half of the reference count (8) is placed in a new entry to the ROT. The reference count in the block then keeps the other half (8). This "middle value" is desirable so as to reduce the invocations of the overflow special case logic.

If references continue to accumulate to a block whose overflow bit is already set, and the reference count of the block maximum is surpassed again, half of the reference count is added to the already existing entry in the ROT. Since the ROT is able to store a full reference count in each entry, the full reference count (the combination of the reference count of the block and the entry in the ROT) can be kept.

Crushing a reference to a block whose reference count is 1, but whose overflow bit is set, results in a search for the entry in the ROT. If the entry has a value which is greater than half the maximum block reference count (8), then half the maximum block reference count (8) is subtracted from the ROT entry and added to the reference count contained in the block. After a series of "underflows" in the reference count of the block, the remaining value in the ROT entry is eventually transferred to the block. This results in the deletion of the ROT entry.

A reference count whch is truly zero requires that both the reference count AND the overflow bit is zero. Put another way, all five bits of the reference count field ust be zero to enable the reclamation of a block. When the reference count of a block reaches zero, and if no binding register is bound to it, it still cannot truly be reclaimed until all the pointers in the block are crushed. This definition is recursive and can imply an arbitrarily large amount of work (such as when a long list becomes suddenly free because the pointer to the list itself is destroyed). In addition to the work, significant storage may be required to keep track of the state of the deallocation process. The following algorithm uses the available space in the blocks being deallocated to maintain the state of the computation required for the process of deallocation:

Let B = pointer to new block with ref cnt = 0 which is to be added to the current list of blocks to be deallocated.

Let T = Temporary pointer.

Let S=Pointer to (current list of) blocks to be deallocated. Ref cnt of S=0 (block pointed to by the pointer S).

```
If S=Nil
Then Set S=B
Else
Set T=S
Increment Refcnt of B (* cell B points to *)
Label A
Case of tag type of l( T)
                        (* 1st cell in block T points to *)
    Tag - Data:
                Set l( T) =B (* Overwrite old value with
                pointer to cell to be remembered *)
    Tag - Pointer:
                If refcnt l( T)=1 (* is this the end of the
                list *)
                Then T=l( T) (* No, iterate down list *)
                Go to A
    Else (* yes, because the next cell has a reference
    count greater than 1 and cannot possibly be deallocated
    yet *)
                Decrement Refcnt l( T) (* It cannot go negative
                *)
                Set l( T) = B
End case
```

The reallocation process itself starts at S (above) and crushes all pointers in the block pointed to by S except the first cell. If the first cell contains a pointer, then it is popped into S and the block deallocated. If not, S is set to Nil and the block deallocated. This algorithm should search all cells in the block for a place to hang the new block pointer (B above) before using the indirection. It also remembers where in the stack the last insert was made and starts the search there.

The Inbound Pointer Table, as described above with reference to FIG. 6, is the other major control structure which is maintained on a pointer change basis. The IPT of an area can be imagined as serving the purpose of the reference count for that area; however, the IPT is a more complicated structure than the reference count.

Any time a pointer is modified, an IPT must be updated if the block containing the pointer is in a different area than the area containing the block to which it points. The area-id, contained in the second header cell of each block, is used to determine whether the area is the same or not, and the area-ids of both the source and target blocks are accessed and compared.

It should be noted that a pointer in the binding register file of the MMU is not considered to be in any area (or it can be viewed as automatically being in the same area as the block to which it points). Thus, it is unnessary to update the IPT when a binding is done.

Like the reference count support, a first implementation merely delays the CPU until changes to the IPT have been completed. However, for the same reasons as the reference count, the immediate processing is separated from that work which can be delayed. Additionally, in the case of the IPT, it is possible to generate multiple page faults to complete the work (one to read the target of the pointer and one to read the portion of the IPT). Although both the reference count and the IPT are maintained any time a pointer is modified, the two operations are basically independent with respect to one another. This allows their implementation as two concurrent processes.

At this point, background reference is made to an article by G. Baker, Jr., "List Processing in Real Time on a Serial Computer", Communications of the ACM, Vol. 21, No. 4. April, 1978, which is incorporated herein by reference and which illustrates the state of the garbage collection art as it pertains to the present invention.

Figure 7:
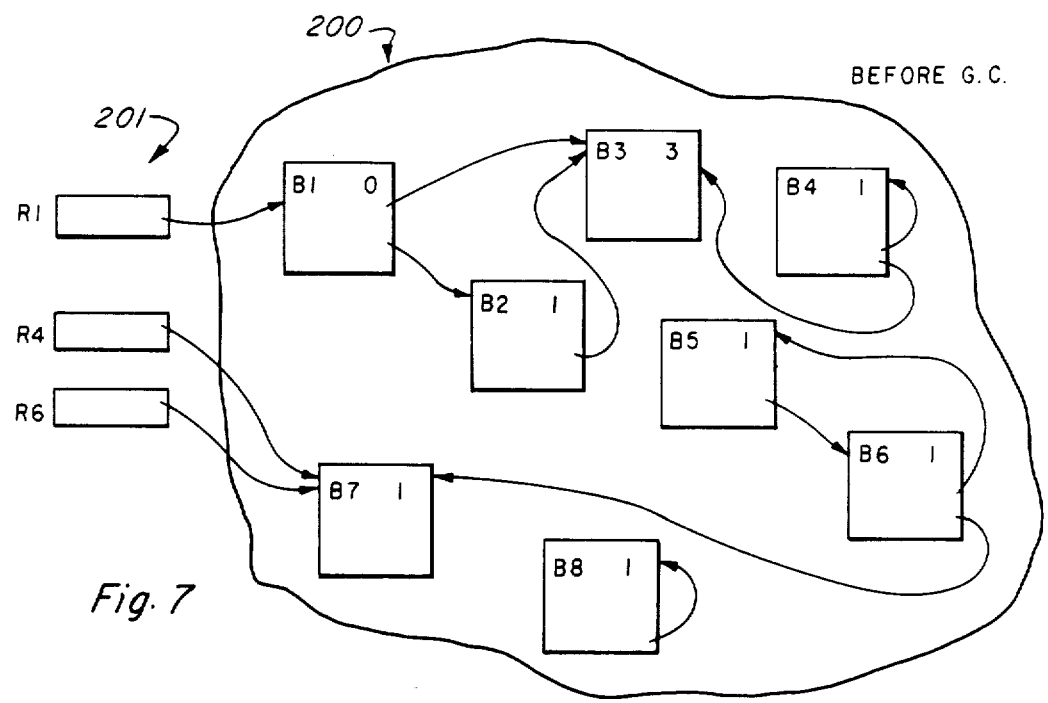
FIG. 7 is a diagram illustrating an area of the virtual address space of the memory system of the invention before garbage collection.

One major purpose for garbage collection is for virtual memory reclamation in order that virtual addresses can be reused. Although the use of reference counts effectively reclaims the majority of unreachable memory blocks, as described above, there are instances when this method falls short. As mentioned, detached circular (cyclic) structures are not reclaimable via the reference count algorithm. The occurrence of cyclic structures comprised of two or more blocks which reference each other and, therefore, have reference counts which never reach zero are quite common. It is also possible that a block is pointed to by one or more cells within that block. It too has a reference count which never reaches zero. Even though such structures may become detached; i.e., made unreachable, from the CPU, the reference count mechanism will not detect that they are reclaimable. However, the garbage blocks not reclaimed via reference counts are reclaimable by a full garbage collection. Such cyclic structures are shown in FIG. 7, below described in detail, and distinguished from complete referencing structures.

An even more important purpose of garbage collection is to compact the virtual address space in order to improve the locality of references. Whereas the CPU's capability to allocate and deallocate memory blocks, and destruction of pointers causes the virtual memory to become highly fragmented, the garbage collector moves accessible memory blocks near each other and, thus, counteracts the fragmentation process.

The garbage collection algorithm described herein is based upon principles set forth by Baker (supra) in his copying collector. Two primary advantages to such a collector are that it requires only one pass to both collect and compact, and that no collector stack is necessary, as will become apparent in the description of the algorithm below.

As mentioned, the memory system of the invention is intended primarily for operations requiring very large virtual memory capabilities. If garbage collection is performed on the memory in its entirety, the process would be extremely timeconsuming. Also, it would be undesirable to require that only half of the virtual memory be usable at any one time, since the unusable half would be necessary for copying into when a Baker-type collection is performed. Both problems are reduced by taking advantage of the use of areas. Thus, small pieces of the virtual address space are garbage collected seperately, on an area-by-area basis, to reduce the necessary time and overhead. Another advantage derived from performing garbage collection on an area-by-area basis is that the frequency of garbage collection within an area can be tuned to the expected rate of garbage accumulation in that area; so that, for instance, stable areas are not garbage collected unnecessarily.

In order to avoid a significant period of time in which the CPU is unable to access an area during a pausing garbage collection, the CPU and the garbage collector act on the binding registers and the virtual address space in parallel. Of course, the intent is to keep the performance degradation, as seen by the CPU, to allocate and access blocks as minimal as possible.

Figure 8:
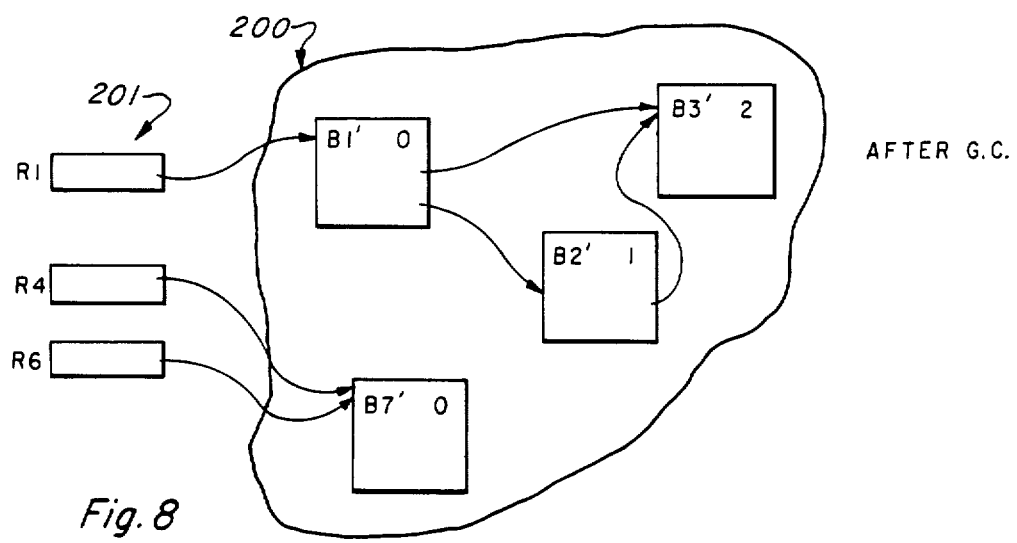
FIG. 8 is an area of the virtual address space of the memory system in according with the invention after garbage collection resulting from the garbage collection process being performed upon the virtual address space illustrated in FIG. 7.

A description of a garbage collection algorithm is set forth below. As described above, the MMU makes use of reference counts for a vast majority of its memory reclamation. The garbage collector, therefore, must uphold the integrity of the reference counts. FIGS. 7 and 8 are a pictorial representation of an area 200 just before and right after garbage collection. In this example, the only pointers into the area 200 originate from binding registers, although inter-area pointers may also point into the area. In this case, the pointers into the area are from binding registers R1, R4, and R6, shown to the left of the area. Within the area are several blocks, labeled B1 thru B8. The number in the upper right corner of each block denotes the reference count of that block. Only blocks which are directly bound to a binding register (B1 and B7), or referenced from a chain of pointers originating from a binding register (B2 and B3), are useful blocks. Block B4 and B8 are not useful blocks, yet they have remained in the area because one of their cells points to itself; i.e., their reference counts are not zero. Blocks B5 and B6 also form a circular list that has remained in the area. In contrast, as shown in FIG. 8, after garbage collection, all useful blocks have survived. The garbage blocks and their pointers have been removed from the area, and the useful reference counts of the remaining blocks have been adjusted to reflect the loss of references to them.

In the implementation of the garbage collection algorithm of the invention, in simplified form, all blocks about to be garbage collected are contained in one of two semispaces, called OLDSPACE and NEWSPACE. All accessible blocks are traced and copied from OLDSPACE to NEWSPACE. A forwarding address is left at the old location of a copied block. Whenever a pointer is traced which points to a block containing a forwarding address, the pointer is updated to point to the copied block. Collection is complete when all accessible blocks have been copied to NEWSPACE. OLDSPACE is then deallocated.

The five phases of garbage collection, in accordance with the present invention, are: (1) an INITIALIZE phase, which sets up a new fragment for placing copies of the useful blocks of an area and initializes necessary pointers; (2) a TRACE phase, where all blocks which are accessible by one or more binding registers, or by a cell from another area are copied; (3) a SCAVENGE phase, where blocks pointed to by cells in blocks which were traced in the TRACE phase are copied; (4) a CLEAN OLDSPACE phase, which crushes pointers of cells in the garbage blocks and prepares cells for reuse; and (5) a FLIP phase, where the garbage collector prepares to give up control.

Figure 9:
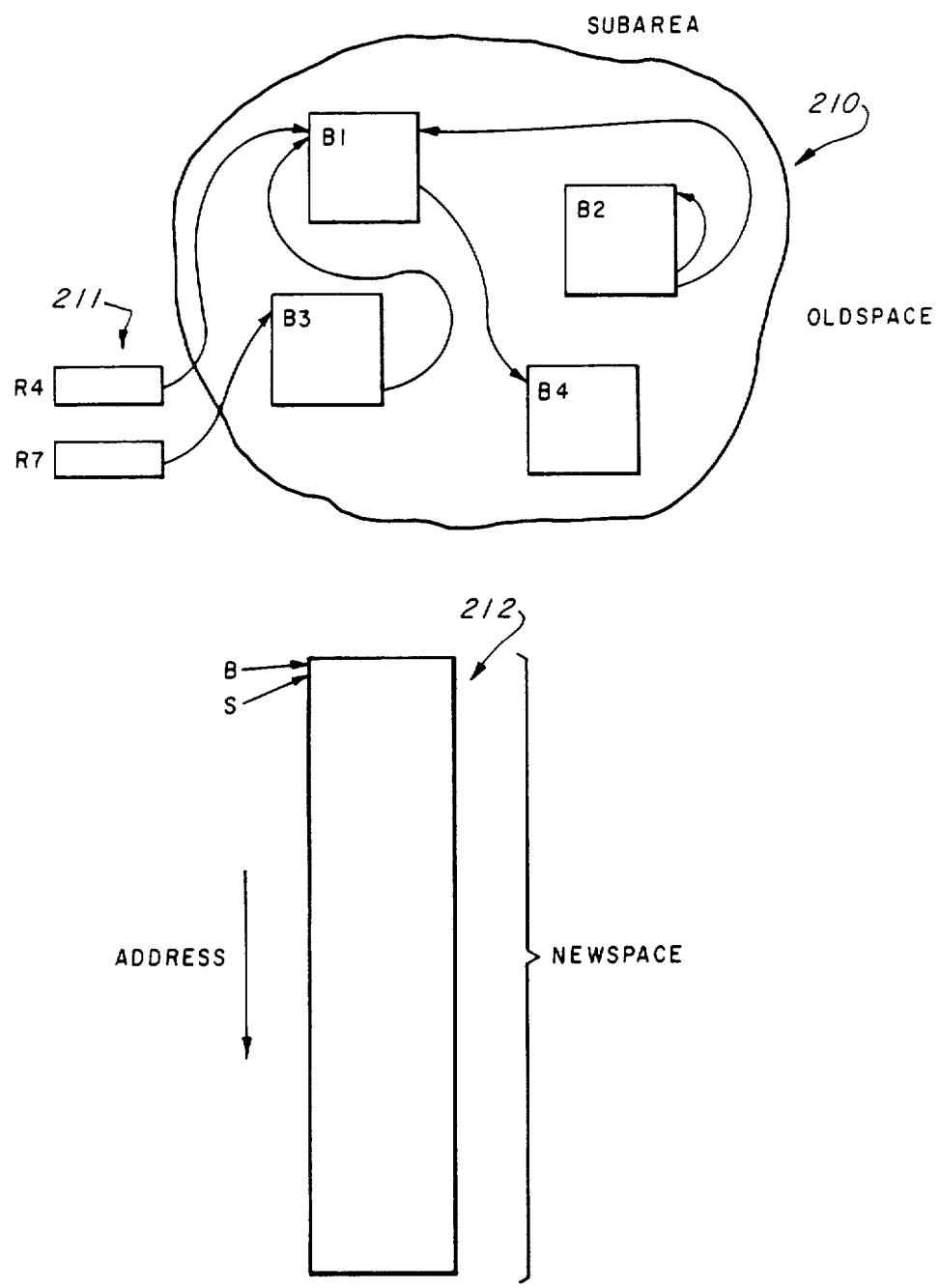
FIG. 9 is an illustration of the portion of the virtual address space of the memory system in accordance with the invention showing the initialization phase of an area in preparation for a garbage collection process.

Thus, in simplified operation, as shown in FIG. 9 when the time comes to garbage collect an area 210, a fragment 212 of memory of size equal to the area is allocated. The new fragment 212 is referred to as the NEWSPACE 212. The original fragment 210, containing useful blocks intermixed with "garbage" is referred to as OLDSPACE 210.

A pointer, B, is initialized to point to the lowest address of NEWSPACE 212. This pointer is used to point to where a block from OLDSPACE 210 is to be copied to NEWSPACE 212. A pointer, S, which is used in the scavenge phase of garbage collection, as described below, is also initialized to point to the lowest address of NEWSPACE 212. A third pointer, T, is initialized to point to the top (the highest address) of NEWSPACE 212. During the course of the garbage collection of the area, all new block allocations, as requested by the CPU, occur at the virtual address space pointed to by pointer T. Pointer T is then advanced to point to the next available lower virtual address.

Once the Initialization phase is complete, the Trace phase begins. Any blocks in OLDSPACE 216 pointed to by one or more of the binding registers must be immediately copied to NEWSPACE 215. Thus, a "rule" of the machine is maintained. The rule is that no bound block will reside in OLDSPACE. As mentioned above, all new allocations will occur in NEWSPACE. The Trace phase will ensure that all bound blocks are copied from OLDSPACE to NEWSPACE. Lastly, if, during garbage collection, a block in OLDSPACE is subsequently bound via a CPU request, it is immediately copied to NEWSPACE.

To begin the Trace phase of the garbage collection, each of the binding registers has its mmu-tag field and area-id field checked. One means of performing such a task is by way of a CAM search, although it is not required. For each binding register, if the mmu-tag field has a value indicating it is a pointer, and the register's area-id field matches the area being garbage collected, then its lock bit (flag) is set. Such action prevents the CPU from accessing bound blocks while they still reside in OLDSPACE. The lock bits remain set until all the bound blocks have been copied to NEWSPACE.

Figure 10A:
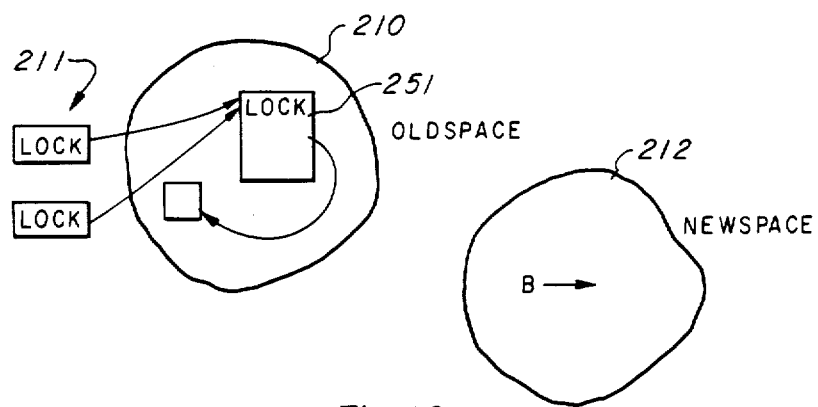
FIGS. 10a–10e illustrate the steps in copying a bound block from a space being garbage collected to a newspace.
Figure 10B:
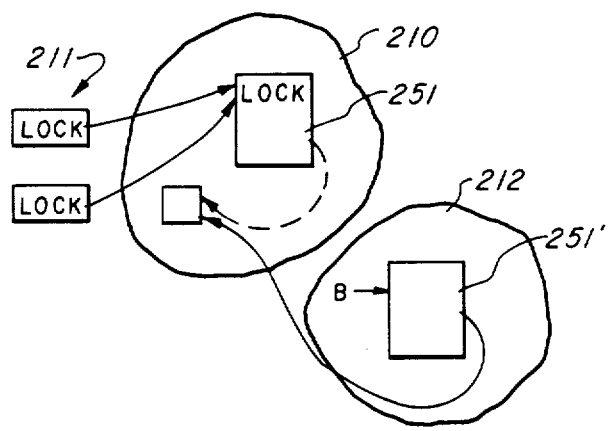

Reference is now made to FIGS. 10(a)-10(e). As shown in FIG. 10(a), NEWSPACE 212 has been created. All binding registers bound to a block in OLDSPACE 210 have been locked by setting their lock bits (as indicated). A block 251 is to be copied to NEWSPACE 212 beginning at pointer B. In order to ensure sole access to a block during its copy, the block's lock bit is set. The need for locking the block is described below. The block 251 is copied to NEWSPACE 212, the copied block being denoted by the reference numeral 251', as shown in FIG. 10(b). Except for the two header cells, each cell of the block 251 in OLDSPACE 210 is reinitialized as it is copied, since the information in these cells is preserved in the copied block, and by reinitializing the cells, any pointers in the user cells are eliminated. If the pointers were to remain, the blocks referenced by the pointers would have an inaccurate reference count, each pointer would exist in both the OLDSPACE block and the copied block in NEWSPACE, yet the reference count of the block pointed to would not reflect the extra pointer.

Figure 10C:
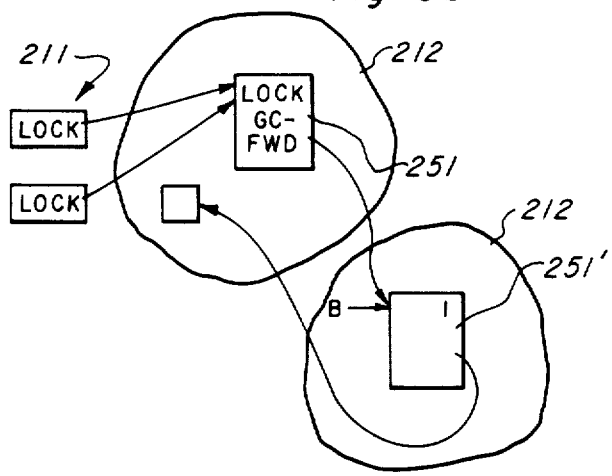

As shown in FIG. 10(c), the mmu-tag field of the block header, Ha, of the block 251 in OLDSPACE 210 is then given the value "gc-forward", and the first user cell, U0, is given the value of the virtual address pointed to by pointer B (the virtual address of the block in NEWSPACE 212). The reference count of the block 251 in NEWSPACE 210 is given the value one to account for the gc-forward pointer.

Figure 10D:
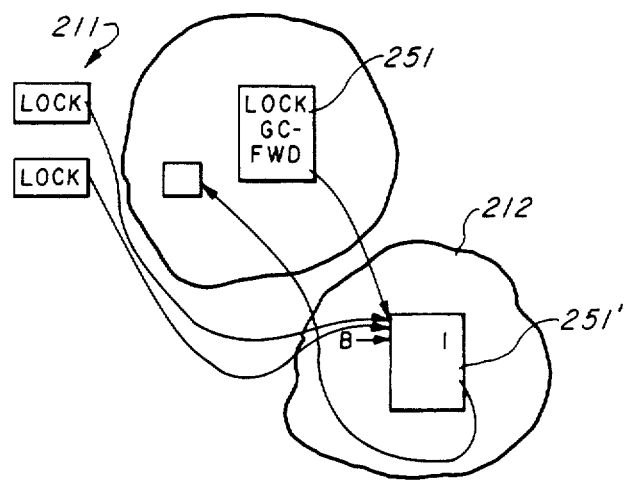
Figure 10E:
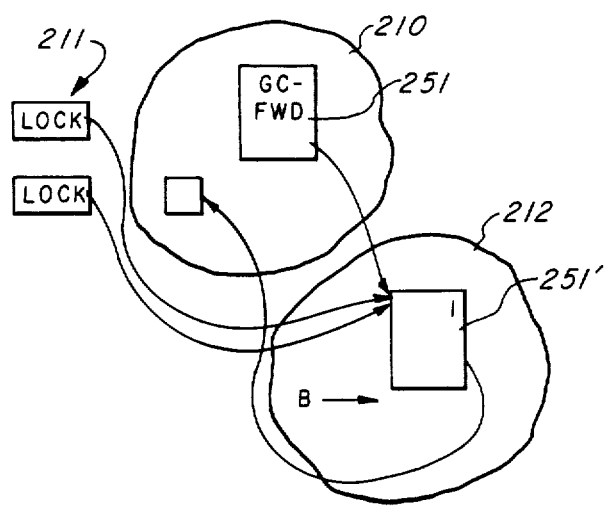

As shown in FIG. 10(d), the virtual address field of all binding registers 211 bound to the copied block 251 in OLDSPACE 210 is changed to the value of the virtual address pointed to by pointer B in NEWSPACE 212. This, in effect, places the new address of the block 251 in NEWSPACE 212 in the field of the binding registers 211. Finally, as shown in FIG. 10(e), pointer B is moved to the cell in NEWSPACE 212 just beyond the last copied block 251, and all lock bits are reset.

Figure 11:
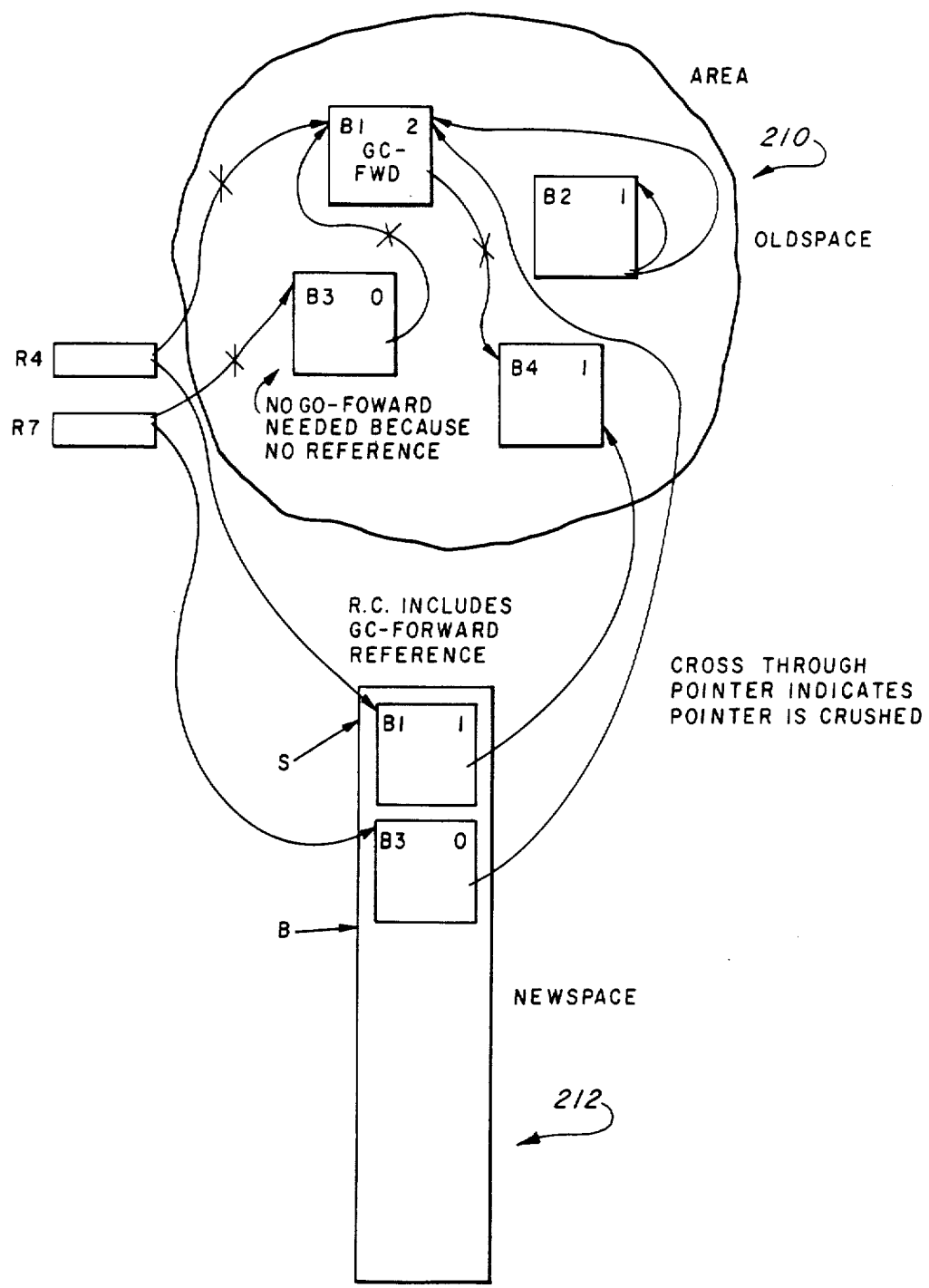
FIG. 11 is an illustration of an area after the binding registers are traced during a garbage collection process.

With reference now to FIG. 11, the binding register trace phase of the garbage collection process is illustrated with respect to the initialized memory space described above with respect to FIG. 9, in the manner described immediately above with respect to FIGS.

10(a)-10(e). Thus, blocks B1 and B3 which are referenced by the respective binding registers R4 and R7 are copied from OLDSPACE 210 to NEWSPACE 212. The pointers from the binding registers to the blocks in OLDSPACE 210 are crushed, and replaced with pointers to the copied blocks in NEWSPACE 212. The header in block B1 is replaced with a gc-forward and the reference count in the copied block B1 in NEWSPACE 212 is incremented. No gc-forward is required in the header of block B3 in OLDSPACE 210 because block B3 has no references to it, other than its binding register R7. The pointer from block B3 in OLDSPACE 210 to the header of block B1 in OLDSPACE is crushed, since it is now replaced by the pointer from block B3 in NEWSPACE 212, and the pointer from block B1 in OLDSPACE 210 to block B4 in OLDSPACE is also crushed, since it is replaced by a pointer from block B1 in NEWSPACE to block B4 in OLDSPACE. The pointer B is moved to the bottom of the last cell of block B3 in NEWSPACE 212, and the area is ready for the second step in the Trace phase in which all inbound inter-area pointers to the area are traced.

All inbound inter-area pointers to the area are known to the garbage collector via the IPT. Each table entry of the IPT, in turn, is used to locate a user cell which is a pointer into the area. As each user cell is located, the data field of the cell is used to determine the virtual memory address of the block pointed to by the cell. This is very much like the action performed during the Scavenge phase described below, except the pointer originates at a user cell in another area instead of a user cell pointed to by a pointer S in NEWSPACE.

Figure 12:
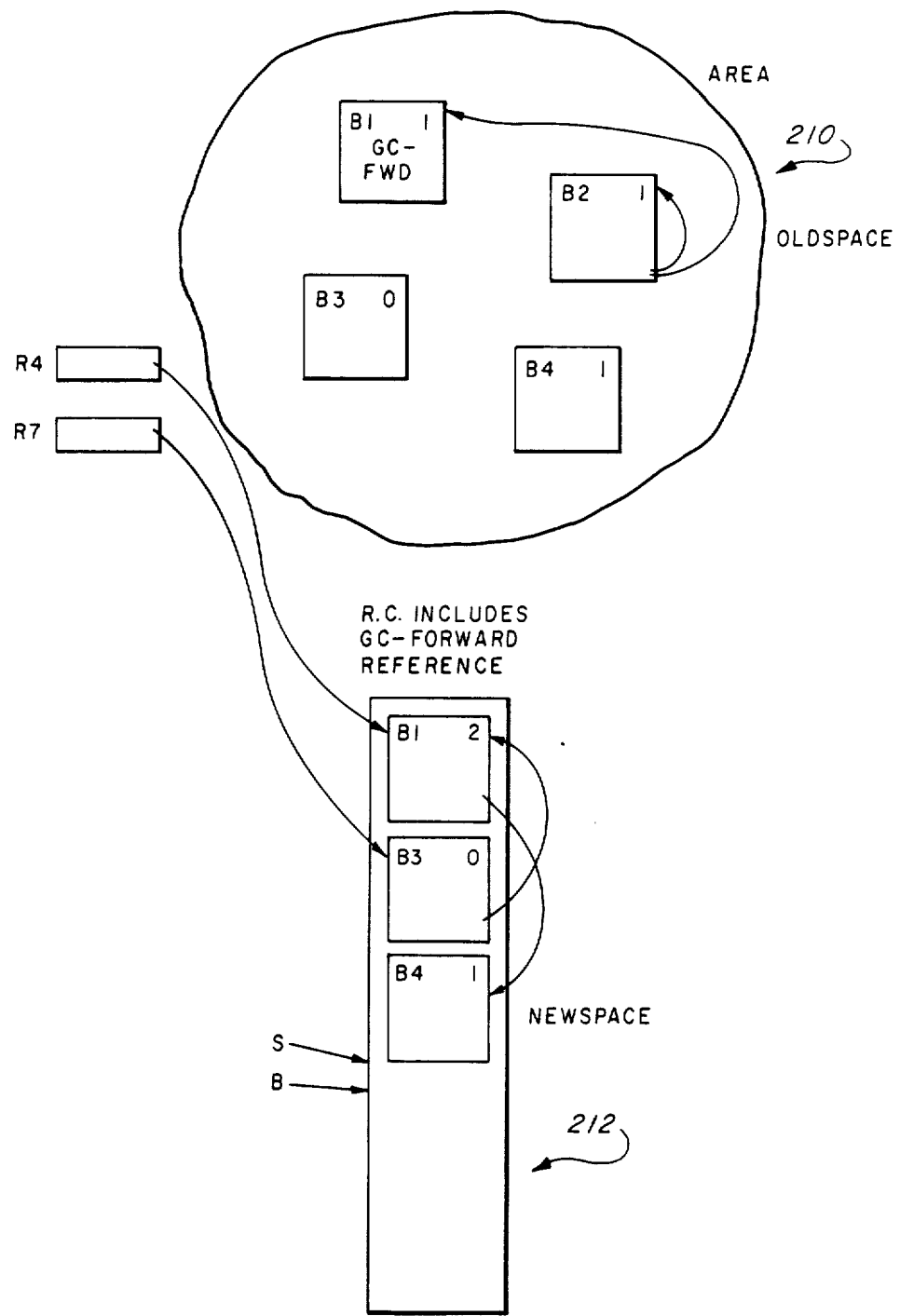
FIG. 12 is an illustration of a memory system showing the results of scavenging the area that was traced in FIG. 11.

The Scavenge phase, as shown in FIG. 12, begins after all blocks in OLSPACE 210 directly accessible from the binding registers or from user cells in other areas have been copied to NEWSPACE 212. With the pointer B in NEWSPACE 212 pointing to the cell just beyond the last copied block, the next step is to "scavenge" the cells between pointer S and pointer B in NEWSPACE 212. If the cell pointed to by S is a non-header cell, its mmu-tag field must be checked to determine if it is a pointer cell. If it is not a pointer cell, pointer S is incremented and the same process is repeated. If the mmu-tag field of the cell contains the value "intra-area", indicating it is an intra-area pointer cell, scavenge action is taken, as described below, before pointer S is incremented and before the process repeated on the next cell. Then pointer S continues to be incremented and the cell it points to checked until S is located at the same cell in NEWSPACE 212 as pointer B.

If the cell at pointer S is found to be an intra-area pointer cell, the data field is used to determine the virtual memory address of the block pointed to by the cell. The pointer is then followed to the block to which it points. It is then determined if the block has or has not previously been copied to NEWSPACE by looking at the contents of the mmu-tag field in the first header of the block. Encountering a "gc-forward" value indicates the block has already been copied; whereas, encountering the value "header-a" indicates the block has not yet been copied.

If header cell Ha's mmu-tag field has the value "header-a", the block is copied to the address pointed to by B in NEWSPACE. Thus, in FIG. 12, block B4 is copied into NEWSPACE 212. To ensure sole access of the memory processor to a block during the block copy, the lock bit of the block is set to temporarily prevent the CPU from accessing the block. The block is then copied, cell by cell. The user cells of the original block, in OLDSPACE, are simultaneously initialized. A gc-forward reference is placed in the original block, in OLDSPACE. The reference count of the copied block, in NEWSPACE, is given the value one to reflect the single reference from the gc-forward. The cell pointing to the block, which was responsible for the copy, is read again. If it is a reference, the pointer is followed. Most likely, it refers to the block in OLDSPACE which was just copied, and therefore contains a gc-forward. If so, the cell which contained the reference is updated to refer to the copied block in NEWSPACE. This also necessitates a decrement of the reference count of the gc-forward block, in OLDSPACE, and an increment of the copied block in NEWSPACE. It is possible, though rare, that the reference to the now-copied block has, in the meantime, been over-written with data or another pointer. In that case, no update or changes to reference counts are made. Finally, the gc-forward block, in OLDSPACE, is unlocked.

The need for checking to see that the same pointer exists in the block copy step may not be obvious. This step is necessary because the user cell referencing the block being copied is part of a block which is NOT locked. Although it is possible to lock the block, it would deny access to all user cells of that block until the copy is completed. There may be several pointers in the block which the CPU may need. Therefore, the block remains accessible. As a consequence, the CPU is capable of crushing the very pointer that initiated the copy of its referent from OLDSPACE to NEWSPACE. The CPU could place a different pointer in the significant user cell, or write data in the cell. When the copy to NEWSPACE is complete, it may be a serious error on the part of the memory processor to blindly update the user cell so that it points to the block in NEWSPACE. Instead, the cell must be read again. If it is no longer a pointer, determined by accessing the mmu-tag, scavenging of the cell is complete. If it is a pointer cell, the pointer is followed. If a gc-forward is encountered, the pointer is updated.

The steps required in copying a block during the Scavenge phase, as well as during the Inter-area Pointer Trace phase, described above, do not include the need to lock out any binding registers which are bound to the block being copied. This is due to the "rule" that no binding register will be bound to a block in OLDSPACE. However, the block being copied must be locked, by setting its lock bit, to ensure exclusive access to the garbage collector. In allowing parallel garbage collection, it is possible that both the CPU and garbage collector could simultaneously access the contents of a particular block. Certain situations have serious problems. For example, while the garbage collector is in the process of copying a block to NEWSPACE, the CPU could perform a valid read from a cell in the block in OLDSPACE which has been reinitialized, or perform a valid write to a cell which has already been copied and therefore not reflected in the block in NEWSPACE. The lock bit can thus be used to prevent the block's being accessed.

In the particular implementation of maintaining inter-area pointers using the IPT, as described, whenever a user cell which is an inter-area pointer is copied to NEWSPACE and the original user cell is reinitialized, as described above, the appropriate IPT entry in the other area must be altered. If no change is made to the IPT, an inbound pointer to the other area, according to the IPT, would originate from the original cell in OLDSPACE instead of the cell in NEWSPACE. Thus, during the cell-by-cell copy of a block from OLDSPACE to NEWSPACE, each cell is checked to see if it is an inter-area pointer. If it is not, the cell can be reinitialized immediately. However, if an inter-area pointer is indicated, the IPT entry in the area where the referent is located is updated to point to the copied cell in NEWSPACE.

Referring again to determining if a block has or has not previously been copied to NEWSPACE, if the mmu-tag field of a block pointed to has the value "gc-forward", no copying is done, since this indicates the block has already been copied. Instead, the cell in NEWSPACE pointed to by S has its data field changed to the value of the data field in the first user cell of the block in OLDSPACE; i.e., the forward virtual address, of the block to which it points. This is shown, for example, with respect to blocks B1 and B3 in NEWSPACE 212, in FIG. 12. Since the pointers no longer reference the gc-forward blocks in OLDSPACE, the reference counts of the OLDSPACE blocks are decremented, and the reference counts of the blocks in NEWSPACE are incremented to account for the new references to them, as shown.

If the reference count of the gc-forward block, in OLDSPACE 210, reaches zero after the steps described above, the gc-forward is no longer needed, since it is guaranteed that there are no more references to the forward. Therefore, no more pointers need to be updated to point to the copied block in NEWSPACE 212. When the reference count of a gc-forward block reaches zero, then, the forward pointer can be crushed. This means, then, that the reference count of the referent of the forward, in NEWSPACE 212, can be decremented by one. The gc-forward block, in OLDSPACE, is not reclaimed, however, as presently discussed.

Once scavenging is completed, all useful blocks have been copied to NEWSPACE 212. Although it is guaranteed that no references from user cells in OLDSPACE 210 have their referents in NEWSPACE, it is quite likely that several gc-forward pointers still make references from OLDSPACE to NEWSPACE. Such a phenomenon arises when there are still references to a gc-forward block in OLDSPACE. One or more garbage blocks with user cells pointing to a gc-forward block results in a non-zero reference count for that gc-forward block. Until the reference count of a gc-forward block reaches zero, the forward reference to the forwarded block in NEWSPACE remains.

Figure 13:
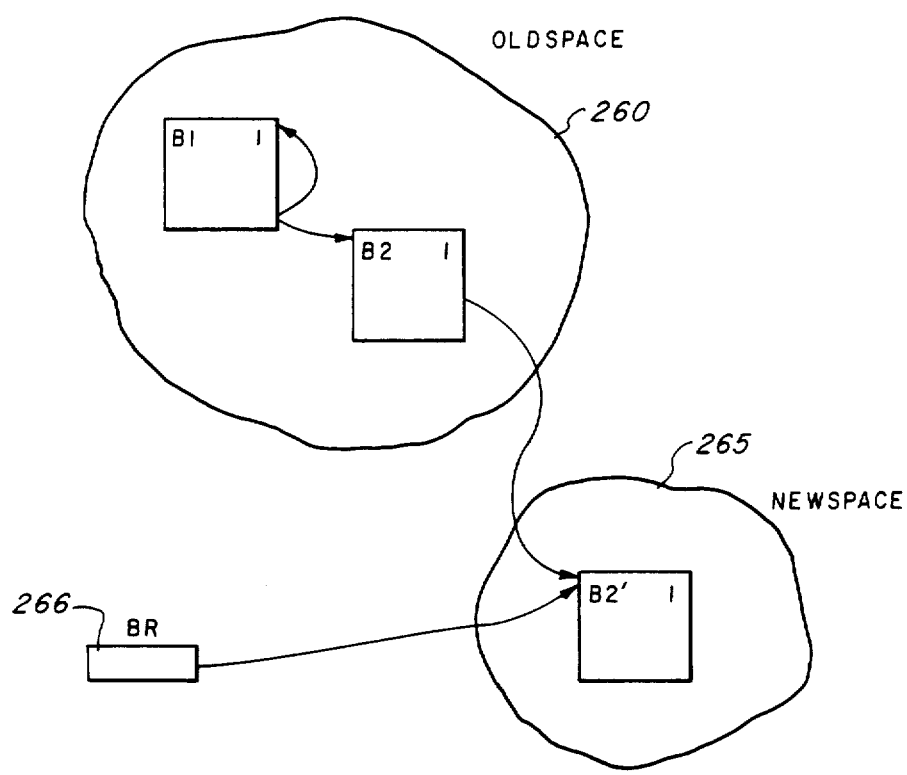
FIG. 13 is a diagram illustrating the old space before cleaning.

FIG. 13 shows in example of remnant forward pointers from OLDSPACE 260 to NEWSPACE 265. Scavenging has just been completed. Block B2' is pointed to by a binding register 266 and is, therefore, in NEWSPACE 265. Block B1 in OLDSPACE is not bound to any binding register nor by any cell in NEWSPACE. It has a reference count greater than zero and has therefore survived garbage collection so far. The danger is that one of the cells of block B1 points to block B2 in OLDSPACE, resulting in a non-zero reference count for block B2. Moreover, block B2, in OLDSPACE, has a forwarding reference to block B2' in NEWSPACE. Block B2' includes the forwarding reference from block B2 in its reference count. Absent corrective action, when garbage collection is complete, block B1 and block B2, both in OLDSPACE, disappear, and block B2' would continue to carry a false reference count. In light of this potential problem which results if OLDSPACE is simply returned to the list of available fragments, it is necessary to also scavenge the cells of all garbage blocks in OLDSPACE and crush any references to other blocks in OLDSPACE. At the same time, the cells in OLDSPACE are reinitialized so that they are ready for reallocation.

Another problem would occur if OLDSPACE were to be simply reclaimed without crushing all pointers in user cells of garbage blocks. Outbound inter-area pointers to blocks in other areas would be erroneously destroyed. Incorrectly destroying an inter-area pointer in a garbage block would result in an incorrect reference count in a block located in another area. Further, the IPT of the other area would continue to reference a non-existent reference into the area. When garbage collection is performed on that area, trying to trace that reference would be a serious problem.

In the process of scavenging the OLDSPACE blocks and crushing the remaining pointers, an opportunity presents itself to cross-check the accuracy or validity of all reference counts of all blocks in the area being garbage collected. Upon completion of the clean OLDSPACE phase of garbage collection, all blocks should have a reference count of zero. Any other outcome would indicate a serious error.

The scheme for cleaning OLDSPACE described below places certain conditions on implementation in order for it to be effective. The method of reclaiming blocks, during the normal course of the reference count mechanism, must include keeping track of blocks which are no longer in use; i.e., the memory processor must have information on the location and size of the "holes" in the virtual address space. The scheme is not impossible if this condition is not met, but it takes considerably longer to complete the phase, since many cells already initialized are unnecessarily scavenged.

It is also desirable for the memory processor to have the ability to "turn off" normal block reclamation in OLDSPACE of the area being garbage collected. If a reference count reaches zero, the reference count mechanism does not return the area occupied by the block to the available memory pool. The memory processor is then able to concentrate its efforts on garbage collection without interruption on the part of the reference count mechanism. After garbage collection, the entire OLDSPACE is returned to the available pool. The description now assumes that reclamation is halted in OLDSPACE; thus, for example, when a gc-forwarded block in OLDSPACE has a reference count which has reached zero, it still remains in OLDSPACE.

A "scavenge" flag bit is provided in header cell Hb of each block (See FIG. 3). This bit becomes useful during this phase of garbage collection. Cleaning OLDSPACE, as described below, entails a single scavenge through OLDSPACE. When the entire OLDSPACE is traversed, each cell is initialized. However, prematurely initializing certain cells, as will become apparent below, destroys information that is still useful. Thus, if a cell is scavenged, but it cannot be initialized until certain conditions are met later in the phase, it is flagged as an already scavenged cell via the scavenge flag bit.

Three kinds of objects exist in OLDSPACE after scavenging NEWSPACE is complete. These are: (1) area fragments not yet allocated; (2) the original useful blocks which were copied to NEWSPACE and which now contain a gc-forwarding address; and (3) garbage blocks.

As one of these objects is pointed to by a pointer, S, which scans the entire length of OLDSPACE a cell at a time, certain actions take place, as described below. The algorithm is not unlike that used for scavenging NEWSPACE, except that large groups of cells are passed over without the need to check their contents. Pointer S touchs only those cells for which there is a need.

Pointer S first points to the lowest-addressed cell in OLDSPACE. At this address, one of the three objects is encountered. What follows is determined by which object it is. Pointer S continues to scan cells until all of OLDSPACE has been traversed. The action taken for each object is as follows:

1. AREA FRAGMENT—If the mmu-tag field of the cell pointed to has a value indicating it is an initializd cell, the next N cells were not allocated just prior to garbage collection; e.g., a block was reclaimed after its reference count reached zero and the cells had not been reallocated to form another block. The number N can be determined by accessing the area fragment list. Pointer S can be incremented by N cells, since there is no need to scavenge the intermediate cells for pointers.

2. BLOCK WITH A GC-FORWARDING ACCESS—If the mmu-tag field of the cell pointed to has the value "gc-forward", the cell is the first header cell, Ha, of a block which has been copied to NEWSPACE. All of the user cells of the block have been reinitialized so its cells need not be scavenged. Pointer S, therefore, can be incremented to the cell located just beyond the block. Although the user cells of the block were reinitialized during the Trace or Scavenge phases, the two header cells and the first user cell, now containing the forwarding address, were not. The forwarding address had remained useful until it was determined that all useful pointers to the block had been crushed. There may be cells in garbage blocks still pointing to the block at pointer S. Without the forwarding address, it could not be known where to decrement the reference count in NEWSPACE when the forward reference can finally be crushed; i.e., after the last reference to the block in OLDSPACE is crushed. The fact that scavenging NEWSPACE is complete indicates that the forward pointer is no longer necessary. Any garbage blocks still pointing to the forward are crushed rather than updated to point to NEWSPACE. Thus, assuming that the gc-forward, in the first user cell, U0, is still there, the pointer can be crushed and its referent, in NEWSPACE, can have its reference count decremented by one. It is possible that the gc-forward pointer has already been crushed, had the reference count to the gc-forward block already reached zero during the earlier phases of garbage collection. Care must be taken in the decision to reinitialize the header cells of the block pointed to by S. The reference count must be checked. If it is zero, meaning that no garbage cells are pointing to it, the cells can be reinitialized. If the reference count is greater than zero, the information must remain. Further, the scavenged bit in Hb is set. This is necessary to ensure that the header cells are reinitialized when the reference count reaches zero, since S continues to advance through OLDSPACE; i.e., it never returns to a cell already passed.

3. GARBAGE BLOCK—If the mmu-tag field of the cell pointed to has the value "header-a", it is the first header cell, Ha, of a garbage block. Before scavenging the cells of the garbage blocks begins, the reference count is checked, just as it was for a block with a forwarding address. If zero, the header cells are reinitialized. If not, the scavenged flag in Hb is set. Each of the block's cells must then be checked. As S is advanced, one cell at a time, through the block, the mmu-tag field is checked to see if it has the value "intra-area" or "inter-area", indicating it is a pointer cell. If it does not, the cell is reinitialized. If it is an intra-area pointer, that pointer must be crushed before the cell is reinitialized. The data field contains the address of the block pointed to. The reference count of the block in OLDSPACE, pointed to by the cell being scavenged, is decremented. If decrementing the reference count leaves it at zero and the scavenged flag in Hb of the block is set, the header cells is reinitialized as there are no more pointers to the block. If the scavenged bit is not set, the now useless cells are reinitialized at the time the S pointer reaches the block. If, on the other hand, the pointer is found to be an inter-area pointer, the pointer is crushed, the referent's reference count is decremented, and the appropriate entry is removed from the IPT of the referent's entry.

Once all accessible blocks have been copied to NEWSPACE and all applicable pointers have been updated, indicated by the fact that pointer S has reached pointer B in NEWSPACE, garbage collection is essentially complete. All that remains is to place OLDSPACE on the fragment list of available cells, and make the unused portion of NEWSPACE, the portion of memory lying between pointer B and pointer T, available to the area allocator. Garbage collection of the area is then complete.

Although the invention has been described and illustrated with a certain degree of particularity, it is understood that the present disclosure has been made by way of example only and that numerous changes in the combination and arrangement of parts may be resorted to by those skilled in the art without departing from the spirit and scope of the invention as hereinafter claimed.

APPENDIX A

```
; This is a flavor-system based simulator of the "logical" Memory Management Unit
; (MMU) simulator of the Artificial Intelligence Engine (AIE).
; The simulator is written in the flavor-system of Zetalisp language of the
; Symbolics-3600 host machine.
; It only simulates the logical abstraction of the MMU. Neither reference count
; management nor garbage collection are simulated, as the garbage is collected
; by the host machine.
; Defines a memory cell as a flavor. Its instance variables are
; the cpu-tag, mmu-tag and data
(defflavor cell    ((cpu-tag 'cpu-tag)
                    (mmu-tag 'status)
                    (data 0))
                   ()
            :gettable-instance-variables
            :settable-instance-variables
            :initable-instance-variables)
```

APPENDIX A-continued

```
; Defines an individual binding register as a flavor.
(defflavor binding-reg   ((flag 'empty)
                          (data nil)
                          (block-size 0)
                          (ref-count 0))
                         ()
                         :gettable-instance-variables
                         :settable-instance-variables
                         :initable-instance-variables)
; The Binding Register Unit (BRU) is defined as a flavor. Its instance
; variables are the binding-reg-array, instruction decoder, and statistics
; accumulator. The binding-reg-array is an array of 32 instances of the
; binding-reg flavor.
(defflavor BRU    ((binding-reg-array (make-array 32
                                                  ':type 'art-q))
                   statistics-accumulator)
                  ()
                  :gettable-instance-variables
                  :settable-instance-variables
                  :initable-instance-variables)
; The methods for the BRU flavor are defined below.
; The first BRU method creates the binding register array.
; This method is expected to be called only once.
(defmethod (BRU  :create-binding-reg-array) ()
   (do  i 0 (1+ i) (=i 32)    ; iterate over the range of all binding registers
      (aset (make-instance 'binding-reg) binding-reg-array i)))
; The second BRU method is "Execute-instruction." It simulates the MMU commands given by the CPU.
(defmethod (BRU  :execute-instruction) (mmu-instruction)
(selectq (first mmu-instruction) ;dispatch on mmu-instruction opcode
   (read-reg (if (neq (funcall (aref binding-reg-array (second mmu-instruction))
                                ':flag) 'empty)
                  (funcall (aref binding-reg-array (second mmu-instruction))
                           ':data)
                  '(Error - attempted to read empty binding register)))
   (write-reg (progn
                  (funcall (aref binding-reg-array (second mmu-instruction))
                           ':set-data (third mmu-instruction))
                  (funcall (aref binding-reg-array (second mmu-instruction))
                           ':set-flag 'data-only)))
   (read-cell (if (and
                     (eq (funcall (aref binding-reg-array (second mmu-instruction))
                                   ':flag) 'bound)
                        (<= (third mmu-instruction)
                            (funcall (aref binding-reg-array (second mmu-instruction))
                                     ':block-size)))
                  (prog1
                     (funcall (aref (funcall
                                       (aref binding-reg-array (second mmu-instruction))
                                       ':data) (1- (third mmu-instruction)))
                              ':data)
                     (funcall (aref (funcall
                                       (aref binding-reg-array (second mmu-instruction))
                                       ':data) (1- (third mmu-instruction)))
                              ':cpu-tag))
                  '(Error - Tried to access an unbound block or beyond block boundary)))
   (write-cell (if (and
                     (eq (funcall (aref binding-reg-array (second mmu-instruction))
                                   ':flag) 'bound)
                        (<= (third mmu-instruction)
                            (funcall (aref binding-reg-array (second mmu-instruction))
                                     ':block-size)))
                  (prog1
                     (funcall (aref (funcall
                                       (aref binding-reg-array (second mmu-instruction))
                                       ':data) (1- (third mmu-instruction)))
                              ':set-data (fourth mmu-instruction))
                     (funcall (aref (funcall
                                       (aref binding-reg-array (second mmu-instruction))
                                       ':data) (1- (third mmu-instruction)))
                              ':set-mmu-tag 'data))
                  '(Error - Tried to access an unbound block or beyond block boundary)))
   (reg-to-reg (if (neq (funcall (aref binding-reg-array (second mmu-instruction))
                                  ':flag) 'empty)
                  (prog1
                     (aset (aref binding-reg-array (second mmu-instruction))
                           binding-reg-array (third mmu-instruction))
                     '(done))
                  '(Error - attempted to copy empty binding register)))
   (reg-to-cell (cond
                  ((eq (funcall (aref binding-reg-array (second mmu-instruction))
                                ':flag) 'empty)
                     '(Error - attempted to copy empty binding register))
```

APPENDIX A-continued

```
                    ((neq (funcall (aref binding-reg-array (third mmu-instruction))
                                   ':flag) 'bound)
                        '(Error - attempted to write into an unbound block))
                    ((> (fourth mmu-instruction)
                        (funcall (aref binding-reg-array (third mmu-instruction))
                                 ':block-size))
                        '(Error - attempted to write beyond block limit))
                    (t
                        (prog1
                            (funcall (aref (funcall
                                            (aref binding-reg-array (third mmu-instruction))
                                            ':data) (1- (fourth mmu-instruction)))
                                     ':set-data (funcall
                                                 (aref binding-reg-array (second mmu-instruction))
                        ':data))
                            '(done)))))
(cell-to-reg (cond
                    ((eq (funcall (aref binding-reg-array (second mmu-instruction))
                                  ':flag) 'empty)
                        '(Error - attempted to read from unbound block))
                    ((> (third mmu-instruction)
                        (funcall (aref binding-reg-array (second mmu-instruction))
                                 ':block-size))
                        '(Error - attempted to read beyond block limit))
                    (t
                        (prog1
                            (funcall (aref binding-reg-array (1- (fourth mmu-instruction)))
                                     ':set-data
                                     (funcall (aref
                                               (funcall (aref binding-reg-array
                                                              (second mmu-instruction)) ':data)
                                               (1- (third mmu-instruction))) ':data))
                            '(done)))))
(cell-to-cell (cond
                    ((eg (funcall (aref binding-reg-array (second mmu-instruction))
                                  ':flag) 'empty)
                        '(Error - attempted to read unbound block))
                    ((> (third mmu-instruction)
                        (funcall (aref binding-reg-array (second mmu-instruction))
                                 ':block-size))
                        '(Error - attempted to read beyond block limit))
                    ((eq (funcall (aref binding-reg-array (fourth mmu-instruction))
                                  ':flag) 'empty)
                            '(Error - attempted to write to unbound block))
                        ((> (fifth mmu-instruction)
                            (funcall (aref binding-reg-array (fourth mmu-instruction))
                                     ':block-size))
                            '(Error - attempted to write beyond block limit))
                        (t
                            (prog1
                                (funcall (aref
                                          (funcall (aref binding-reg-array
                                                        (fourth mmu-instruction)) ':data)
                                          (1- (fifth mmu-instruction))) ':set-data
                                         (funcall (aref
                                                   (funcall (aref binding-reg-array
                                                                  (second mmu-instruction)) ':data)
                                                   (1- (third mmu-instruction))) ':data))
                                '(done)))))
    (allocate (prog1
                (funcall (aref binding-reg-array (second mmu-instruction))
                         ':set-data (make-array (third mmu-instruction)
                                                ':leader-length 3
                                                ':leader-list (list 0 'initialized
                                                                    (third mmu-instruction))
                                                ':type 'art-q))
                (funcall (aref binding-reg-array (second mmu-instruction))
                         ':set-flag 'bound)
                (funcall (aref binding-reg-array (second mmu-instruction))
                         ':set-block-size (third mmu-instruction))
                (funcall (aref binding-reg-array (second mmu-instruction))
                         ':set-ref-count 0)
                (do i 0 (1+ i) (= i (third mmu-instruction))
                    (aset (make-instance 'cell)
                          (funcall (aref binding-reg-array (second mmu-instruction)) ':data)
                          i))))
    (otherwise '(Illegal mmu-instruction))))
; Defines the MMU-BRU by making an instance of the flavor BRU
(setq mmu-bru (make-instance 'BRU))
; Creates the binding-reg-array with 32 instances of binding register flavor as
; elements
(funcall mmu-bru ':create-binding-reg-array)
```

APPENDIX A-continued

```
; A test function "f1-1" consisting of 12 MMU instructions
(defun f1-1 ( )
    (funcall mmu-bru ':execute-instruction '(allocate 1 10))
    (funcall mmu-bru ':execute-instruction '(allocate 2 100))
    (funcall mmu-bru ':execute-instruction '(write-cell 1 10 fun))
    (funcall mmu-bru ':execute-instruction '(reg-to-reg 1 3))
    (funcall mmu-bru ':execute-instruction '(reg-to-cell 1 2 100))
    (funcall mmu-bru ':execute-instruction '(cell-to-reg 2 100 4))
    (funcall mmu-bru ':execute-instruction '(read-cell 4 10))
    (funcall mmu-bru ':execute-instruction '(cell-to-cell 2 100 4 1))
    (funcell mmu-bru ':execute-instruction '(read-cell 4 1))
    (funcall mmu-bru ':execute-instruction '(allocate 5 16))
    (funcall mmu-bru ':execute-instruction '(write-cell 5 1 not-fun))
    (funcall mmu-bru ':execute-instruction '(read-cell 5 1)))
; A test function "f1-100" consisting of 100 repetitions of f1-1
; thus, simualting 1200 MMU instructions
(defun f1 = 100 ( )
    (do i 0 (1 + i) (= i 100)
      (f1-1)))
; A test function "f1-1000" consisting of 1000 repetitions of f1-1
; thus, simualting 12000 MMU instructions
(defun f1-1000 ( )
    (do i 0 (1 + i) (= i 1000)
      (f1-1)))
```

What is claimed is:

1. A memory system for use with a user processor, comprising:

a physical memory;

a binding register unit having a plurality of registers accessed by the user processor, said registers containing only identifiers for blocks of memory and data, wherein said binding register unit enables relative location indexing by the user processor for data manipulation;

means independent from the user processor for managing the physical memory and binding register unit, wherein the memory system functions as a collection of user specified blocks accessed only through the binding register unit;

computer program means for controlling the physical memory; and binding register managing means for performing garbage collection of a virtual address space representing the physical memory independently from and in parallel with the operation of the user processor, wherein all blocks which cannot be reached by following pointers directly or indirectly from any binding register are garbage, and all blocks which can be reached by following pointers directly or indirectly from any binding register are not garbage.

2. A memory system for use with a central processor of a computer system, comprising:

a plurality of binding registers, wherein the central processor accesses memory only by reference to a binding register and an offset value;

a physical memory having an address space;

a memory manager having a memory processor, wherein said memory manager translates references to binding registers and offsets by the central processor into addresses in said physical memory; and a garbage collector in said memory manager and operated by the memory processor, wherein said garbage collector identifies regions of memory which are no longer accessible to the central processor and releases them for use by the memory manager, and wherein all regions accessible to the central processor consist of those regions which can be reached directly or indirectly by following pointers from any binding register

* * * * *